(12) United States Patent
Hatanaka et al.

(10) Patent No.: US 7,700,714 B2
(45) Date of Patent: Apr. 20, 2010

(54) OPTICAL ELEMENT AND ACHROMATIC LENS

(75) Inventors: Kunio Hatanaka, Chiyoda-ku (JP);
Yoshihiko Imanaka, Chiyoda-ku (JP);
Masanori Monri, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 12/084,620

(22) PCT Filed: Nov. 8, 2006

(86) PCT No.: PCT/JP2006/322691

§ 371 (c)(1),
(2), (4) Date: May 7, 2008

(87) PCT Pub. No.: WO2007/055390

PCT Pub. Date: May 18, 2007

(65) Prior Publication Data
US 2009/0143560 A1  Jun. 4, 2009

(30) Foreign Application Priority Data

Nov. 10, 2005 (JP) ............... 2005-325996
Nov. 10, 2005 (JP) ............... 2005-325997
Nov. 10, 2005 (JP) ............... 2005-325998

(51) Int. Cl.
*C08G 64/00* (2006.01)
*C08G 63/00* (2006.01)
(52) U.S. Cl. .............. 528/196; 264/176.1; 264/219; 359/485; 369/284; 528/176; 528/198
(58) Field of Classification Search ........... 264/176.1, 264/219; 359/485; 369/284; 528/176, 196, 528/198
See application file for complete search history.

(56) References Cited

U.S. PATENT DOCUMENTS

| 5,409,975 | A | 4/1995 | Nishiguichi et al. |
| 5,475,786 | A | 12/1995 | Nishiguchi et al. |
| 5,556,904 | A | 9/1996 | Nishiguchi et al. |
| 5,847,877 | A | 12/1998 | Imamura et al. |
| 6,759,471 | B1 | 7/2004 | Ukuda |
| 6,781,756 | B1 | 8/2004 | Ishii |
| 6,930,833 | B2 | 8/2005 | Nakai |
| 7,196,132 | B2 | 3/2007 | Ukuda |
| 7,271,956 | B2 | 9/2007 | Ishii |
| 2006/0171031 | A1 | 8/2006 | Suzuki |

FOREIGN PATENT DOCUMENTS

| JP | 62-18501 | 1/1987 |
| JP | 64-31825 | 2/1989 |
| JP | 3-61911 | 3/1991 |
| JP | 5-294029 | 11/1993 |
| JP | 6-145333 | 5/1994 |
| JP | 6-200005 | 7/1994 |
| JP | 6-282094 | 10/1994 |
| JP | 6-347650 | 12/1994 |
| JP | 9-127321 | 5/1997 |
| JP | 9-127322 | 5/1997 |
| JP | 2001-74901 | 3/2001 |
| JP | 2004-78166 | 3/2004 |
| JP | 2004-238487 | 8/2004 |
| JP | 2005-68216 | 3/2005 |
| JP | 2005-107298 | 4/2005 |

*Primary Examiner*—Terressa M Boykin
(74) *Attorney, Agent, or Firm*—Wenderoth, Lind & Ponack, L.L.P.

(57) ABSTRACT

There are provided an optical element that comprises a polymer which has a structural unit derived from a specific dihydroxy compound typified by 2,2-bis(4-hydroxyphenyl)-1,1,1,3,3,3-hexafluoro propane (bisphenol AF) and in which the relationship between a refractive index $n_D$ and an Abbe number $v_D$ satisfies the following formula (I):

$$n_D + 0.0076 \times v_D \leq 1.78 \qquad (I)$$

and that is used for correction of chromatic aberration, and an achromatic lens using the optical element.

11 Claims, 3 Drawing Sheets

CROSS-SECTIONAL VIEW      FRONT VIEW

CROSS-SECTIONAL VIEW

FRONT VIEW

OPTICAL ELEMENT AND ACHROMATIC LENS

FIELD OF THE INVENTION

This invention relates to an optical element and an achromatic lens.

BACKGROUND ART

It is known that an optical lens (convex lens) shows a characteristic that a refractive index with short-wavelength light is higher than that with long-wavelength light, i.e. axial chromatic aberration, and has color bleeding (chromatic aberration). Since the chromatic aberration is a problem in using the optical lens, the optical lens is generally used as a lens system or laminated lens having chromatic aberration corrected by combining achromatic elements.

As the achromatic element, a concave lens has been used. In recent years, use of a Fresnel lens has been receiving attention (refer to JP-A 9-127321, JP-A 9-127322, JP-A 2004-78166 and JP-A 2005-107298)(the term "JP-A" as used herein means an "unexamined published Japanese patent application").

For correction of the chromatic aberration, the lens system is constituted by a plurality of elements made of different materials whose Abbe numbers, which are indicators for the degree of the chromatic aberration, are largely different. As a material for lenses, glass has been used. Since glass has a refractive index of about 1.46 to 1.92 and an Abbe number of about 25 to 80 and the optical properties can be selected from the very wide ranges, it provides high flexibility to design of the lens system for correcting the chromatic aberration, and it is an advantageous material for exhibiting various lens properties.

When the above lens system is applied to a camera, video camera or the like, reductions in the size and weight of the lens system are required. Particularly, a telephoto lens system and super-telephoto lens system having a large lens diameter have been massive and heavy and difficult to handle when attached to a camera and used, so that one may miss a right moment to release a shutter. Accordingly, reductions in the weight and whole length of the lens system have been desired. To that end, it is necessary to reexamine the material for the lens and shorten focal length after correction of chromatic aberration.

From such a viewpoint, use of a plastic material in place of glass as the lens material has been desired.

Typical materials for the current plastic lenses are polymethyl methacrylate (PMMA) and polycarbonate. Of these, the PMMA is used far more often, because it not only has advantages that it has high transparency and hardness and excellent durability but also has a high Abbe number of 57 or small chromatic aberration.

As a material for a plastic lens used for correction of chromatic aberration of a PMMA lens, polycarbonate (PC (BIS-A)) produced from 2,2-bis(4-hydroxyphenyl)propane (bisphenol A) is generally used. The Abbe number of the PC(BIS-A) is 32 and greatly differs from the Abbe number of the PMMA which is 57. Thus, it supposedly has the requirement for correction of chromatic aberration. However, even with the PC(BIS-A), the focal length after correction of chromatic aberration has not yet reached a satisfactory level.

Meanwhile, it has been considered that a higher refractive index of a lens material is more advantageous from the viewpoint of a reduction in the weight of a lens. That is, it has been considered that when the refractive index is low, the curve of the lens must be made tight to obtain a desired effect, so that the entire lens must be made thick, and this is against the request of the weight reduction.

It is known that conventionally known plastic optical materials have a definite relationship between a refractive index and an Abbe number. FIG. 1 shows relationships between the refractive indices and Abbe numbers of general-purpose optical plastic materials described in known literatures. Referring to FIG. 1, it can be understood that the plastic materials show a tendency that the Abbe number becomes lower as the refractive index becomes higher and a collection of plotted points each representing the relationship between the refractive index and Abbe number of each material is situated within a very narrow range. Efforts to improve the plastic materials as conventional optical elements have been directed primarily to developments of materials showing a high refractive index exceeding the above range (refer to Japan Chemical Industry Association Monthly, 40 (8), 27 (1987) and Japan Chemical Industry Association Monthly 47 (2), 8 (1994)).

However, it has not yet been known what material is to be used as an achromatic element which is suitable for correction of chromatic aberration in a lens system and can constitute a lens system having shortened focal length after correction of chromatic aberration.

Polycarbonate materials have been known as materials having transparency and heat resistance, and many improvements and studies have been made on the materials. However, most of them are improvements of mechanical properties as engineering plastics (refer to JP-A 6-145333 and JP-A 6-200005) or are intended to use the materials for special purposes (refer to JP-A 5-294029). Most of studies in optical applications are improvements of mechanical properties in fields that involve only a single wavelength such as an optical fiber, a photoreceptor for photocopying or a recording layer of an optical disk (refer to JP-A 6-347650, JP-A 3-61911, JP-A 6-282094 and JP-A 64-31825). Only in JP-A 62-18501, improvements and studies have been made to apply polycarbonate materials to lenses. However, in this publication, material studies intended to improve the heat resistance and surface hardness of lenses have been made, and in examples, convex lenses made of the materials are merely disclosed.

DISCLOSURE OF THE INVENTION

The present invention has been conceived in view of the above circumstances, and an object thereof is to provide an optical element that can be suitably used for correction of chromatic aberration of a lens system or laminated lens and an achromatic lens using the optical element.

The optical element of the present invention can take a form such as a concave lens, Fresnel lens or diffraction grating and can be suitably used in combination with other optical elements (such as a convex lens, Fresnel lens and diffraction grating) to constitute an achromatic lens system or laminated achromatic lens.

Firstly, the above object of the present invention is achieved by an optical element comprising a polymer which has a structural unit represented by the following general formula (i):

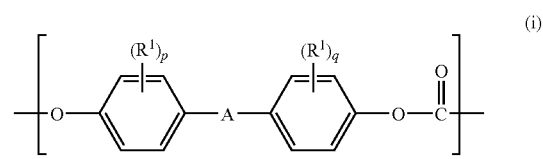

(wherein $R^1$s are each independently a halogen atom or a monovalent organic group which is selected from the group consisting of an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms and an aralkyloxy group having 7 to 20 carbon atoms and whose hydrogen atoms may be partially or fully substituted with a halogen atom, p and q are each independently an integer of 0 to 4, A is a single bond or a divalent group selected from the following formulas (i-1) to (i-4):

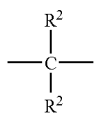

(i-1)

(wherein R²s are each independently a hydrogen atom, a halogen atom, or a hydrocarbon group having 1 to 10 carbon atoms whose hydrogen atoms may be partially or fully substituted with a halogen atom)

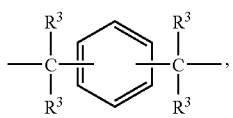

(i-2)

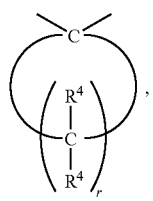

(i-3)

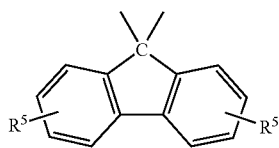

(i-4)

(wherein R³s, R⁴s and R⁵s are each independently a hydrogen atom, a halogen atom, or a hydrocarbon group having 1 to 4 carbon atoms whose hydrogen atoms may be partially or fully substituted with a halogen atom, and r is an integer of 4 to 11), and when A is a single bond or a divalent group containing no fluorine atom, p and q are not 0 at the same time and at least one of R¹s present in the formula (i) is a fluorine atom or a monovalent organic group whose hydrogen atoms have been partially or fully substituted with a fluorine atom)
and in which the relationship between a refractive index $n_D$ and an Abbe number $v_D$ satisfies the following formula (I):

$$n_D + 0.0076 \times v_D \leq 1.78 \qquad (I),$$

and the optical element being used for correction of chromatic aberration.

Secondly, the above object of the present invention is achieved by an optical element comprising a material having an Abbe number $v_D$ of 50 to 60 and a refractive index $n_D$ of 1.48 to 1.55 and an achromatic lens comprising the above optical element.

The achromatic lens of the present invention using the optical element of the present invention is lightweight, has short focal length after correction of chromatic aberration and can be suitably used for a telephoto lens system or super-telephoto lens system for an analog or digital camera, video camera and the like.

BEST MODE FOR CARRYING OUT THE INVENTION

Figure 1:
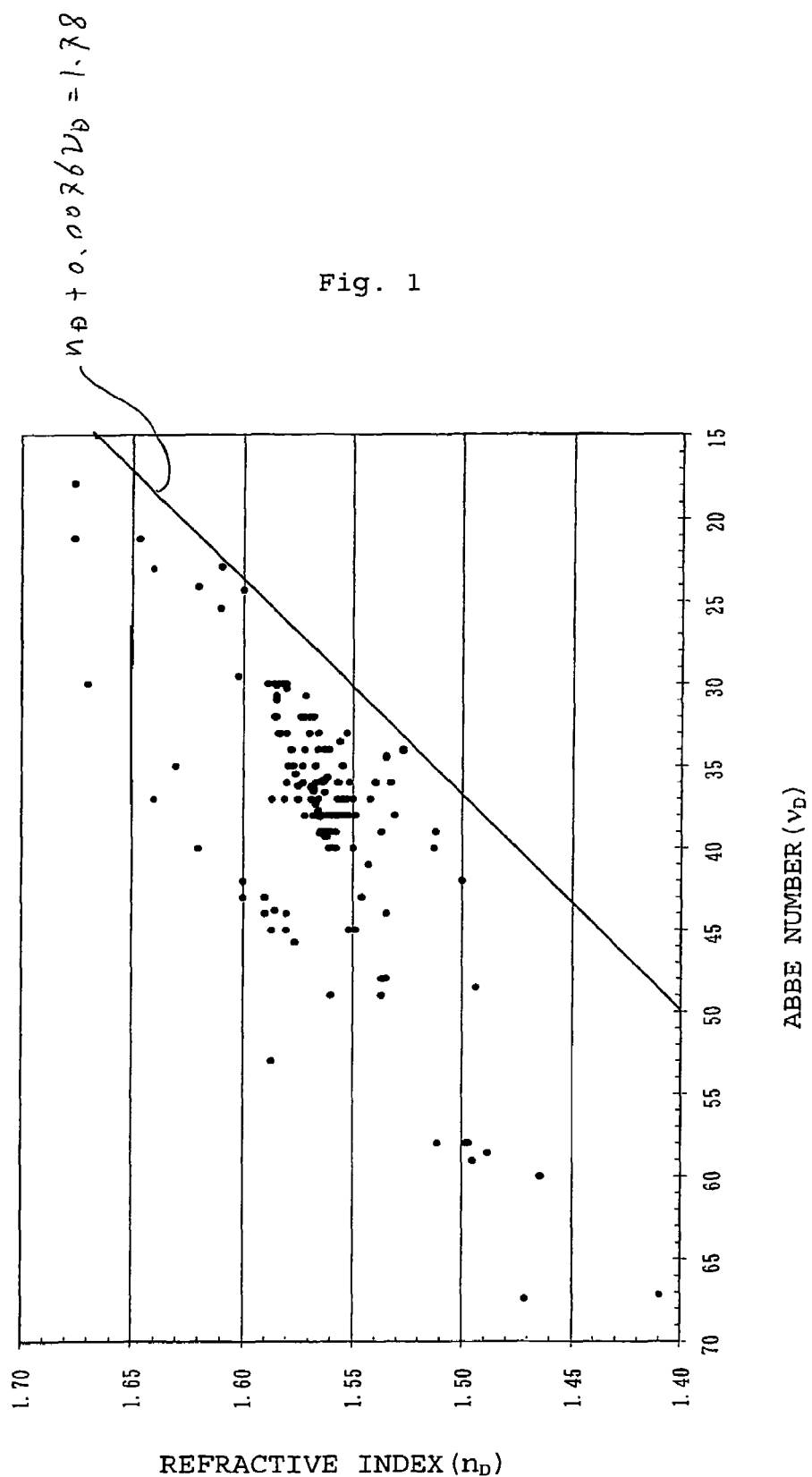
FIG. 1 is a graph showing the relationships between the refractive indices and Abbe numbers of conventionally known plastic lens materials, wherein plotted points have been adopted from Japanese Patent Application Laid-Open Nos. JP-A 1-66234, JP-A 5-294671, JP-A 6-25398, JP-A 6-228296, JP-A 6-248063, JP-A 6-263861, JP-A 11-349676, JP-A 2000-47001, JP-A 2000-63506, JP-A 2000-95933, JP-A 2000-136241, JP-A 2000-136242, JP-A 2000-230044, JP-A 2000-302860, JP-A 2001-11165, JP-A 2001-11166, JP-A 2001-11168, JP-A 2001-11169, JP-A 2002-90501, JP-A 2002-201277, JP-A 2002-212275, JP-A 2002-265585, JP-A 2002-226570, JP-A 2002-293911, JP-A 2002-293912, JP-A 2002-338678, JP-A 2002-371179, JP-A 2003-48974, JP-A 2003-55543, JP-A 2003-73468, JP-A 2003-90901, JP-A 2003-160659, JP-A 2003-160660, JP-A 2004-75799, JP-A 2004-10801, JP-A 2005-42032, JP-A 2005-77963, JP-A 64-31825 and JP-A 62-18501.

An optical element of the present invention comprises a polymer having a structural unit represented by the above formula (i).

Illustrative examples of a halogen atom in the structural unit represented by the above formula (i) include a fluorine atom, chlorine atom, bromine atom and iodine atom. Of these, the fluorine atom is preferred.

In the structural unit represented by the above formula (i), R¹ when A is a single bond is preferably a fluorine atom.

In the structural unit represented by the above formula (i), R² when A is a divalent group represented by the above formula (i-1) is preferably a hydrogen atom, fluorine atom, methyl group, difluoromethyl group, perfluoroalkyl group having 1 to 10 carbon atoms, phenyl group, fluorophenyl group or perfluorophenyl group. Illustrative examples of the above perfluoromethyl group having 1 to 10 carbon atoms include a trifluoromethyl group, perfluoro-n-propyl group and perfluoro-n-nonyl group, and the trifluoromethyl group in particular is preferred. When both of two R²s are a group selected from a hydrogen atom, a methyl group and a phenyl group, it is preferred that at least one of p and q be not 0 and at least one of R¹s be a fluorine atom or a trifluoromethyl group.

In the structural unit represented by the above formula (i), R³ when A is a divalent group represented by the above formula (i-2) is preferably a perfluoroalkyl group having 1 to 4 carbon atoms, particularly preferably a trifluoromethyl group. When A is a divalent group represented by the above formula (i-2), both p and q are preferably 0.

In the structural unit represented by the above formula (i), R⁴ when A is a divalent group represented by the above formula (i-3) is preferably a hydrogen atom or a fluorine atom, and r is preferably 4, 5 or 11. When both of two $R^4$s are a hydrogen atom, it is preferred that at least one of p and q be not 0 and at least one of $R^1$s be a fluorine atom.

In the structural unit represented by the above formula (i), $R^5$ when A is a divalent group represented by the above formula (i-4) is preferably a hydrogen atom, at least one of p and q is preferably not 0, and at least one of $R^1$s is preferably a fluorine atom or a perfluoroalkyl group having 1 to 4 carbon atoms. As the perfluoroalkyl group having 1 to 4 carbon atoms, a trifluoromethyl group is particularly preferred.

A fluorine containing weight ratio $F_M$ in the structural unit represented by the above formula (i) is preferably 0.22 to 0.63, more preferably 0.25 to 0.55. The fluorine containing weight ratio $F_M$ is a value obtained by dividing the weight of fluorine atoms contained in the structural unit (i) by the weight of the structural unit (i).

The polymer having the structural unit represented by the above formula (i) can be obtained by reacting a dihydroxy compound corresponding to a desired structural unit, i.e. a compound represented by the following formula (i'):

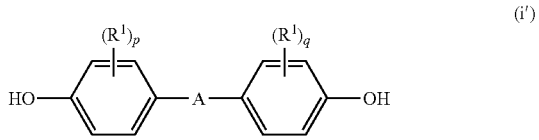

(i')

(wherein $R^1$, p, q and A are the same as defined above formula (i)), with a carbonate precursor in accordance with an interfacial polymerization, solution polymerization or melt polymerization method. In this case, the structural unit represented by the above formula (i) is derived from the compound represented by the above formula (i').

Hereinafter, specific examples of the structural unit represented by the above formula (i) will be described based on specific examples of the dihydroxy compound (i') from which the structural unit is derived. It can be easily understood by one skilled in the art that a specific dihydroxy compound (i') is reacted with a carbonate precursor to obtain a polymer having a structural unit (i) that corresponds to the structure of the dihydroxy compound.

Illustrative examples of a dihydroxy compound (i') from which the structural unit represented by the above formula (i) wherein A is a single bond is derived include octafluoro-4,4'-biphenol, 3,3'-difluoro-4,4'-biphenol, 3,3',5,5'-tetrafluoro-4,4'-biphenol, and 2,2',5,5'-tetrafluoro-4,4'-biphenol.

Illustrative examples of a dihydroxy compound (i') from which the structural unit represented by the above formula (i) wherein A is the formula (i-1) is derived include 1,1-bis(3-fluoro-4-hydroxyphenyl)methane, 1,1-bis(3,5-difluoro-4-hydroxyphenyl)methane, 1,1-bis(4-hydroxyphenyl)-2,2-difluoroethane, 1,1-bis(4-hydroxyphenyl)-2,2,2-trifluoroethane, 2,2-bis(3-fluoro-4-hydroxyphenyl)propane, 2,2-bis(3,5-difluoro-4-hydroxyphenyl)propane, 2,2-bis(4-hydroxy-3-trifluoromethylphenyl)propane, 2,2-bis(4-hydroxyphenyl)-1,1,1-trifluoropropane, 2,2-bis(3,5-dimethyl-4-hydroxyphenyl)-1,1,1-trifluoropropane, 2,2-bis(4-hydroxyphenyl)-1,1,1,3,3-pentafluoropropane, 2,2-bis(4-hydroxyphenyl)-1,1,1,3,3,3-hexafluoropropane (referred to as "bisphenol AF" by those skilled in the art), 2,2-bis(4-hydroxy-3-methylphenyl)-1,1,1,3,3,3-hexafluoropropane, 2,2-bis(3,5-dimethyl-4-hydroxyphenyl)-1,1,1,3,3,3-hexafluoropropane, 2,2-bis(3-fluoro-4-hydroxyphenyl)-1,1,1,3,3,3-hexafluoropropane, 2,2-bis(3,5-difluoro-4-hydroxyphenyl)-1,1,1,3,3,3-hexafluoropropane, 2,2-bis(4-hydroxy-2,3,5,6-tetrafluorophenyl)-1,1,1,3,3,3-hexafluoropropane, 2,2-bis(4-hydroxy-3-phenylphenyl)-1,1,1,3,3,3-hexafluoropropane, 2,2-bis(4-hydroxy-3-(2-propyl)phenyl)-1,1,1,3,3,3-hexafluoropropane, 1,1-bis(4-hydroxyphenyl)-perfluorobutane, 1,1-bis(4-hydroxyphenyl)-perfluorooctane, 1,1-bis(4-hydroxyphenyl)-perfluorodecane, 1,1-bis(4-hydroxyphenyl)-1-phenyl-2,2,2-trifluoroethane, 1,1-bis(4-hydroxyphenyl)-1-(2,3,4,5,6-pentafluorophenyl)methane, 1,1-bis(4-hydroxyphenyl)-1-phenylfluoromethane, 1,1-bis(3-fluoro-4-hydroxyphenyl)-1-phenylmethane, 1,1-bis(4-hydroxy-3,5-difluorophenyl)-1-phenylmethane, bis(3-fluoro-4-hydroxyphenyl)diphenylmethane, bis(4-hydroxy-3,5-difluorophenyl)diphenylmethane, 1,1-bis(3-fluoro-4-hydroxyphenyl)-1-(4-fluorophenyl)ethane, 1,1-bis(4-hydroxy-3,5-difluorophenyl)-1-(4-fluorophenyl)ethane, and 1,1-bis(4-hydroxyphenyl)-1-(4-fluorophenyl)ethane.

Illustrative examples of a dihydroxy compound (i') from which the structural unit represented by the above formula (i) wherein A is the formula (i-2) is derived include α,α'-bis(4-hydroxyphenyl)-m-bis(1,1,1,3,3,3-hexafluoroisopropyl)benzene and α,α'-bis(4-hydroxyphenyl)-p-bis(1,1,1,3,3,3-hexafluoroisopropyl)benzene.

Illustrative examples of a dihydroxy compound (i') from which the structural unit represented by the above formula (i) wherein A is the formula (i-3) is derived include 1,1-bis(3-fluoro-4-hydroxyphenyl)cyclohexane, 1,1-bis(4-hydroxyphenyl)perfluorocyclopentane, 1,1-bis(4-hydroxyphenyl)perfluorocyclohexane, and 1,1-bis(4-hydroxyphenyl)perfluorocyclododecane.

Illustrative examples of a dihydroxy compound (i') from which the structural unit represented by the above formula (i) wherein A is the formula (i-4) is derived include 9,9-bis(3-fluoro-4-hydroxyphenyl)fluorene and 9,9-bis(4-hydroxy-3-trifluoromethylphenyl)fluorene.

Of these, to achieve the above preferred value of the fluorine containing weight ratio $F_M$ in the structural unit represented by the above formula (i) a dihydroxy compound (i') that achieves a fluorine containing weight ratio $F_M$ in a structural unit derived from the dihydroxy compound of 0.22 to 0.63 is preferably used, and a dihydroxy compound (i') that achieves a fluorine containing weight ratio $F_M$ in a structural unit derived from the dihydroxy compound of 0.25 to 0.55 is more preferably used. Specific examples of preferred dihydroxy compounds (i') selected from that viewpoint will be enumerated below. In the examples enumerated below, a numerical value in parentheses indicates a fluorine containing weight ratio $F_M$ in a structural unit (i) derived from each preferred dihydroxy compound (i').

Specific examples of preferred dihydroxy compounds (i') wherein A is a single bond include octafluoro-4,4'-biphenol [0.43], 3,3',5,5'-tetrafluoro-4,4'-biphenol[0.27] and 2,2',5,5'-tetrafluoro-4,4'-biphenol[0.27].

Specific examples of preferred dihydroxy compounds (i') wherein A is the formula (i-1) include 1,1-bis(3,5-difluoro-4-hydroxyphenyl)methane[0.25], 2,2-bis(3,5-difluoro-4-hydroxyphenyl)propane[0.23], 2,2-bis(4-hydroxy-3-trifluoromethylphenyl)propane[0.29], 2,2-bis(4-hydroxyphenyl)-1,1,1,3,3-pentafluoropropane[0.28], bisphenol AF [0.31], 2,2-bis(4-hydroxy-3-methylphenyl)-1,1,1,3,3,3-hexafluoropropane[0.29], 2,2-bis(3,5-dimethyl-4-hydroxyphenyl)-1,1,1,3,3,3-hexafluoropropane[0.27], 2,2-bis(3-fluoro-4-hydroxyphenyl)-1,1,1,3,3,3-hexafluoropropane[0.38], 2,2-bis(3,5-difluoro-4-hydroxyphenyl)-1,1,1,3,3,3-hexafluoropropane[0.44], 2,2-bis(4-hydroxy-2,3,5,6-tetrafluorophenyl)-1,1,1,3,3,3-hexafluoropropane[0.53], 2,2- bis(4-hydroxy-3-phenylphenyl)-1,1,1,3,3,3-hexafluoropropane[0.22], 2,2-bis(4-hydroxy-3-(2-propyl)phenyl)-1,1,1,3,3,3-hexafluoropropane[0.26], 1,1-bis(4-hydroxyphenyl)-perfluorobutane[0.37], 1,1-bis(4-hydroxyphenyl)-perfluorooctane[0.51], 1,1-bis(4-hydroxyphenyl)-perfluorodecane[0.54], 1,1-bis(4-hydroxyphenyl)-1-(2,3,4,5,6-pentafluorophenyl)methane [0.24], and 1,1-bis(4-hydroxy-3,5-difluorophenyl)-1-(4-fluorophenyl)ethane[0.23]. Specific examples of preferred dihydroxy compounds (i') wherein A is the formula (i-2) include α,α'-bis(4-hydroxyphenyl)-m-bis(1,1,1,3,3,3-hexafluoroisopropyl)benzene[0.39] and α,α'-bis(4-hydroxyphenyl)-p-bis(1,1,1,3,3,3-hexafluoroisopropyl)benzene [0.39]. Specific examples of preferred dihydroxy compounds (i') wherein A is the formula (i-3) include 1,1-bis(4-hydroxyphenyl)perfluorocyclopentane[0.35], 1,1-bis(4-hydroxyphenyl)perfluorocyclohexane[0.39], and 1,1-bis(4-hydroxyphenyl)perfluorocyclododecane[0.54]. Specific examples of preferred dihydroxy compounds (i') wherein A is the formula (i-4) include 9,9-bis(4-hydroxy-3-trifluoromethylphenyl)fluorene[0.22].

Fluorine atoms contained in the structural unit represented by the above formula (i) are preferably derived from a perfluoroalkyl group because the fluorine containing weight ratio $F_M$ in the structural unit can be increased with ease.

From that viewpoint, A in the structural unit represented by the above formula (i) is preferably a divalent group represented by the above formula (i-1) or (i-2); when A is a divalent group represented by the above formula (i-1), at least one of $R^2$s in the structural unit (i) is preferably a perfluoroalkyl group having 1 to 10 carbon atoms; and when A is a divalent group represented by the above formula (i-2) at least one of $R^3$s in the structural unit (i) is preferably a perfluoroalkyl group having 1 to 4 carbon atoms.

Specific examples of more preferred dihydroxy compounds (i') wherein A is the formula (i-1) from which such a structural unit (i) is derived include bisphenol AF, 2,2-bis(4-hydroxy-3-methylphenyl)-1,1,1,3,3,3-hexafluoropropane, 2,2-bis(3,5-dimethyl-4-hydroxyphenyl)-1,1,1,3,3,3-hexafluoropropane, 2,2-bis(3-fluoro-4-hydroxyphenyl)-1,1,1,3,3,3-hexafluoropropane, 2,2-bis(3,5-difluoro-4-hydroxyphenyl)-1,1,1,3,3,3-hexafluoropropane, 2,2-bis(4-hydroxy-2,3,5,6-tetrafluorophenyl)-1,1,1,3,3,3-hexafluoropropane, 2,2-bis(4-hydroxy-3-phenylphenyl)-1,1,1,3,3,3-hexafluoropropane, 2,2-bis(4-hydroxy-3-(2-propyl)phenyl)-1,1,1,3,3, 3-hexafluoropropane, 1,1-bis(4-hydroxyphenyl)-perfluorobutane, 1,1-bis(4-hydroxyphenyl)-perfluorooctane, and 1,1-bis(4-hydroxyphenyl)-perfluorodecane. Specific examples of more preferred dihydroxy compounds (i') wherein A is the formula (i-2) include α,α'-bis(4-hydroxyphenyl)-m-bis(1,1,1,3,3,3-hexafluoroisopropyl)benzene and α,α'-bis(4-hydroxyphenyl)-p-bis(1,1,1,3,3,3-hexafluoroisopropyl)benzene.

of these, bisphenol AF is particularly preferred, since it is easy to obtain and handle.

These dihydroxy compounds (i') can be used alone or in combination of two or more.

The polymer used in the present invention may contain other structural unit in addition to the structural unit represented by the above formula (i). The content of the structural unit (i) contained in the polymer is preferably at least 50 mol %, more preferably at least 75 mol %, much more preferably 75 to 99 mol %, particularly preferably 75 to 95 mol %, based on the total of the structural unit represented by the above formula (i) and the other structural unit.

The other structural unit contained in the polymer used in the present invention together with the structural unit represented by the above formula (i) is preferably a structural unit derived from a dihydroxy compound other than the compound represented by the above formula (i'). An example thereof is a structural unit represented by the following formula (ii) or (iii):

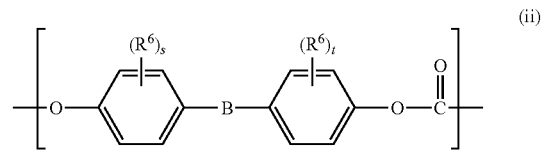

(wherein $R^6$s are each independently a halogen atom other than a fluorine atom or a monovalent organic group which is selected from the group consisting of an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms and an aralkyloxy group having 7 to 20 carbon atoms and whose hydrogen atoms may be partially or fully substituted with a halogen atom other than a fluorine atom, s and t are each independently an integer of 0 to 4, and B is a single bond or a divalent group selected from the following formulas (ii-1) to (ii-8):

(wherein $R^7$s are each independently a hydrogen atom, a halogen atom other than a fluorine atom, or a hydrocarbon group having 1 to 6 carbon atoms)

(wherein $R^8$s and $R^9$s are each independently a hydrogen atom, a halogen atom other than a fluorine atom or a hydrocarbon group having 1 to 4 carbon atoms, and u is an integer of 4 to 6).)

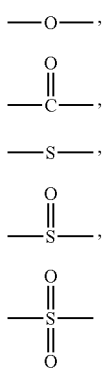

(ii-4)

(ii-5)

(ii-6)

(ii-7)

(II-8)

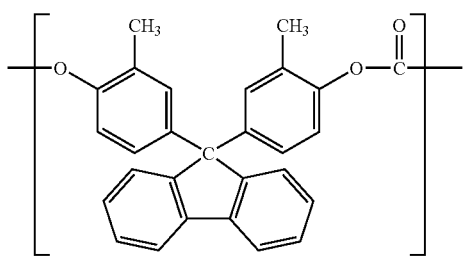

(iii)

In the structural unit represented by the above formula (ii), when B is a single bond, both s and t are preferably 0 or 1.

In the structural unit represented by the above formula (ii), $R^7$ when B is a divalent group represented by the above formula (ii-1) is preferably a hydrogen atom, an alkyl group having 1 to 6 carbon atoms or a phenyl group. Illustrative examples of the above alkyl group having 1 to 6 carbon atoms include a methyl group, ethyl group, n-propyl group and n-hexyl group. When B is a divalent group represented by the above formula (ii-1), it is preferred that both s and t be 0 or at least one of s and t be not 0 and $R^6$ be an alkyl group having 1 to 10 carbon atoms, a cycloalkyl group having 6 to 20 carbon atoms, an aryl group having 6 to 20 carbon atoms or a halogen atom other than a fluorine atom. $R^6$ when at least one of s and t is not 0 is preferably a methyl group, an isopropyl group, a t-butyl group, a cyclohexyl group, a phenyl group, a chlorine atom or a bromine atom. A particularly preferred structural unit when B is a divalent group represented by the above formula (ii-1) is a structural unit in which s and t are each independently 0 or 1 and $R^6$ and $R^7$ are a methyl group.

In the structural unit represented by the above formula (ii), $R^8$ when B is a divalent group represented by the above formula (ii-2) is preferably an alkyl group having 1 to 4 carbon atoms, particularly preferably a methyl group. When B is a divalent group represented by the above formula (ii-2), it is preferred that both s and t be 0 or at least one of s and t be not 0 and $R^6$ be an alkyl group having 1 to 10 carbon atoms. As the above alkyl group having 1 to 10 carbon atoms as $R^6$, a methyl group is preferred. A particularly preferred structural unit when B is a divalent group represented by the above formula (ii-2) is a structural unit in which s and t are each independently 0 or 1 and $R^6$ and $R^8$ are a methyl group.

In the structural unit represented by the above formula (ii), $R^9$ when B is a divalent group represented by the above formula (ii-3) is preferably a hydrogen atom or an alkyl group having 1 to 4 carbon atoms, particularly preferably a hydrogen atom, a methyl group or an isopropyl group, and u is preferably 4 or 5. When B is a divalent group represented by the above formula (ii-3), it is preferred that both s and t be 0 or at least one of s and t be not 0 and $R^6$ be a cyclohexyl group. A particularly preferred structural unit when B is a divalent group represented by the above formula (ii-3) is a structural unit in which s and t are each independently 0 or 1, $R^6$ is a cyclohexyl group, $R^9$ is a methyl group and u is 5.

In the structural unit represented by the above formula (ii), when B is a divalent group represented by any of the above formulas (ii-4) to (ii-8), it is preferred that both s and t be 0 or at least one of s and t be not 0 and $R^6$ be an alkyl group having 1 to 10 carbon atoms or an aryl group having 6 to 10 carbon atoms. $R^6$ when at least one of s and t is not 0 is preferably a methyl group or a phenyl group.

Illustrative examples of the halogen atom other than a fluorine atom in the structural unit represented by the above formula (ii) include a chlorine atom, bromine atom and iodine atom.

A polymer comprising the structural unit represented by the above formula (i) and the structural unit represented by the above formula (ii) or (iii) can be obtained by carrying out a reaction with a carbonate precursor by use of the dihydroxy compound represented by the above formula (i') and a dihydroxy compound corresponding to the desired structural unit (ii) or (iii), i.e. a compound represented by the following formula (ii'):

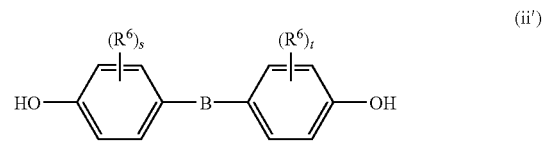

(ii')

(wherein $R^6$, s, t and B are the same as defined in the above formula (ii)),
or a compound represented by the following formula (iii').

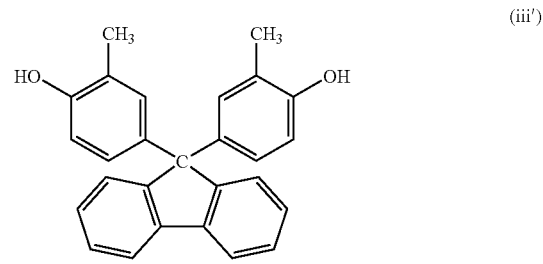

(iii')

Hereinafter, specific examples of the structural unit represented by the above formula (ii) will be described based on specific examples of the dihydroxy compound (ii') from which the structural unit is derived. It can be easily understood by one skilled in the art that a specific dihydroxy compound (ii') together with a dihydroxy compound (i') are reacted with a carbonate precursor to obtain a polymer having a structural unit (ii) that corresponds to the structure of the dihydroxy compound (ii') in addition to the structural unit (i).

Illustrative examples of a preferred compound when B in the above formula (ii) is a single bond include 4,4'-biphenol.

Illustrative examples of a preferred compound when B is the formula (ii-1) include 1,1-bis(4-hydroxyphenyl)methane, 1,1-bis(4-hydroxyphenyl)ethane, 2,2-bis(4-hydroxyphenyl) propane (referred to as "bisphenol A" by those skilled in the art), 1,1-bis(4-hydroxyphenyl)-1-phenylethane, 2,2-bis(4- hydroxy-3-methylphenyl)propane (referred to as "bisphenol C" by those skilled in the art), 2,2-bis(4-hydroxyphenyl)butane, 2,2-bis(4-hydroxyphenyl)pentane, 2,2-bis(4-hydroxy-3-phenylphenyl)propane, 2,2-bis(3-isopropyl-4-hydroxyphenyl)propane, 2,2-bis(3-t-butyl-4-hydroxyphenyl)propane, 2,2-bis(4-hydroxyphenyl)butane, 4,4-bis(4-hydroxyphenyl)heptane, 2,2-bis(4-hydroxyphenyl)octane, 2,2-bis(3-bromo-4-hydroxyphenyl)propane, bis(4-hydroxyphenyl)diphenylmethane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, and 2,2-bis(3-cyclohexyl-4-hydroxyphenyl)propane.

Illustrative examples of a preferred compound when B is the formula (ii-2) include α,α'-bis(4-hydroxyphenyl)-o-diisopropylbenzene, α,α'-bis(4-hydroxy-3-methylphenyl)-o-diisopropylbenzene, α,α'-bis(3,5-dimethyl-4-hydroxyphenyl)-o-diisopropylbenzene, α,α'-bis(4-hydroxyphenyl)-m-diisopropylbenzene (referred to as "bisphenol M" by those skilled in the art), α,α'-bis(4-hydroxy-3-methylphenyl)-m-diisopropylbenzene, α,α'-bis(3,5-dimethyl-4-hydroxyphenyl)-m-diisopropylbenzene, α,α'-bis(4-hydroxyphenyl)-p-diisopropylbenzene, α,α'-bis(4-hydroxy-3-methylphenyl)-p-diisopropylbenzene, and α,α'-bis(3,5-dimethyl-4-hydroxyphenyl)-p-diisopropylbenzene.

Illustrative examples of a preferred compound when B is the formula (ii-3) include 1,1-bis(4-hydroxyphenyl)cyclohexane, 1,1-bis(4-hydroxyphenyl)-3,3,5-trimethylcyclohexane, 1,1-bis(4-hydroxyphenyl)-4-isopropylcyclohexane, 1,1-bis(3-cyclohexyl-4-hydroxyphenyl)cyclohexane, and 1,1-bis(4-hydroxyphenyl)cyclopentane.

Illustrative examples of a preferred compound when B is any of the formulas (ii-4) to (ii-8) include bis(4-hydroxyphenyl)ether, bis(4-hydroxy-3-methylphenyl)ether, bis(4-hydroxy-3-phenylphenyl)ether, 4,4'-dihydroxybenzophenone, bis(4-hydroxyphenyl)sulfide, bis(4-hydroxy-3-methylphenyl)sulfide, bis(4-hydroxy-3-phenylphenyl)sulfide, bis(4-hydroxyphenyl)sulfoxide, bis(4-hydroxy-3-methylphenyl)sulfoxide, bis(4-hydroxy-3-phenylphenyl)sulfoxide, bis(4-hydroxyphenyl)sulfone, bis(4-hydroxy-3-methylphenyl)sulfone, and bis(4-hydroxy-3-phenylphenyl)sulfone.

Of these, the compounds when B is represented by the formula (ii-1), (ii-2), (ii-3) or (ii-6) are more preferred. Particularly preferred compounds when B is represented by (ii-1) are 2,2-bis(4-hydroxyphenyl)propane ("bisphenol A"), 2,2-bis(4-hydroxy-3-methylphenyl)propane ("bisphenol C") and 1,1-bis(4-hydroxyphenyl)-1-phenylethane. Particularly preferred compounds when B is represented by the formula (ii-2) are α,α'-bis(4-hydroxyphenyl)-m-diisopropylbenzene and α,α'-bis(4-hydroxy-3-methylphenyl)-m-diisopropylbenzene. Particularly preferred compounds when B is represented by the formula (ii-3) are 1,1-bis(4-hydroxyphenyl)cyclohexane and 1,1-bis(4-hydroxyphenyl)-3,3,5-trimethylcyclohexane. A particularly preferred compound when B is represented by the formula (ii-6) is bis(4-hydroxy-3-methylphenyl)sulfide.

The polymer used in the present invention is preferably as follows. That is, in the above formula (i), p and q are 0, A is a divalent group represented by the above formula (i-1), and $R^2$ is a trifluoromethyl group; in the above formula (ii), B is a divalent group represented by the above formula (ii-1), (ii-2) or (ii-3); when B is a divalent group represented by the above formula (ii-1), both s and t are 0 or 1, and $R^6$ and $R^7$ are a methyl group; and when B is a divalent group represented by the above formula (ii-2) or (ii-3), both s and t are 0, $R^8$ is a methyl group, $R^9$ is a hydrogen atom, and u is 5.

Specific examples of such a polymer include a bisphenol AF homopolymer, bisphenol AF/1,1-bis(4-hydroxyphenyl)-1-phenylethane copolymer, bisphenol AF/2,2-bis(4-hydroxyphenyl)propane copolymer, bisphenol AF/1,1-bis(4-hydroxyphenyl)cyclohexane copolymer, bisphenol AF/1,1-bis(4-hydroxyphenyl)-3,3,5-trimethylcyclohexane copolymer, bisphenol AF/9,9-bis(4-hydroxy-3-methylphenyl)fluorene copolymer, bisphenol AF/α,α'-bis(4-hydroxyphenyl)-m-diisopropylbenzene copolymer, and bisphenol AF/2,2-bis(4-hydroxy-3-methylphenyl)propane copolymer.

The fluorine containing weight ratio $F_p$ (value obtained by dividing the weight of fluorine atoms contained in the polymer by the weight of the polymer) of the polymer used in the present invention is preferably 0.15 to 0.60, more preferably 0.16 to 0.55, much more preferably 0.17 to 0.50. Therefore, when the dihydroxy compounds are reacted with the carbonate precursor, the dihydroxy compound (i') and the dihydroxy compound (ii') or (iii') are preferably used in amounts adjusted such that the fluorine containing weight ratio $F_p$ in the polymer to be produced falls within the above range. More suitably, the amounts of the dihydroxy compound (i') and the dihydroxy compound (ii') or (iii') are desirably adjusted such that the content of the structural unit (i) in the polymer becomes preferably at least 50 mol %, more preferably at least 75 mol %, much more preferably 75 to 99 mol %, particularly preferably 75 to 90 mol %, based on the total of the structural unit (i) and the structural unit (ii) or (iii).

The dihydroxy compounds used in the reaction with the carbonate precursor are preferably of high purity and preferably have a Hazen unit color number of not larger than 50, more preferably not larger than 30. The Hazen unit pigment of the dihydroxy compound can be measured by using a 20-wt % solution of the dihydroxy compound as a material by a calorimetric method at 25° C. in accordance with JIS K0071-1.

Illustrative examples of the carbonate precursor which can be used to obtain the polymer having the structural unit represented by the above formula (i) by reacting the above dihydroxy compounds with the carbonate precursor by an interfacial polymerization, solution polymerization or melt polymerization method include a carbonyl halide and carbonate ester.

The above interfacial polymerization method can be carried out by reacting the dihydroxy compounds with a carbonyl halide, preferably phosgene, in an organic solvent in the presence of an acid binder and preferably a catalyst. As the above acid binder, an alkali metal hydroxide such as sodium hydroxide or potassium hydroxide is preferably used. As the organic solvent, a halogenated hydrocarbon such as methylene chloride or chlorobenzene is preferably used. Illustrative examples of the catalyst that is optionally used include a tertiary amine, a quaternary ammonium salt and a quaternary phosphonium salt. Specific examples thereof include triethylamine, tetra-n-butylammonium bromide, and tetra-n-butylphosphonium bromide. It is preferred that the reaction temperature be 0 to 40° C., the reaction time be several minutes to 5 hours, and the pH during the reaction be kept at 9 or higher.

The solution polymerization method is carried out by reacting the dihydroxy compounds with a carbonyl halide, preferably phosgene, in an organic solvent. As an acid binder used in this case, an aromatic tertiary amine is preferred. Specific examples thereof include pyridine, quinoline, isoquinoline, and dimethylaniline. Pyridine in particular is preferably used. As the organic solvent, hydrocarbons such as benzene, toluene and xylene, and halogenated hydrocarbons such as methylene chloride, chloroform, dichloroethane, chlorobenzene and dichlorobenzene are preferred, and methylene chloride is particularly preferred. The acid binder is preferably used in an amount of 2 to 100 equivalents, more preferably 2 to 50 equivalents, per equivalent of the carbonyl halide. The reaction temperature is preferably 0 to 40° C., and the reaction time is preferably several minutes to several days, more preferably 10 minutes to 5 hours.

The above melt polymerization method is generally a transesterification reaction between the dihydroxy compounds and a carbonate ester, and a method comprising mixing the dihydroxy compounds with the carbonate ester under heating in the presence of inert gas and distilling out a produced alcohol or phenol is preferably carried out. Although the reaction temperature varies according to the boiling point of the alcohol or phenol produced and the like, it is preferably 120 to 350° C. The reaction time is preferably about 1 to 10 hours. It is preferable to reduce the pressure of the reaction system to about 10 to 1,300 Pa in the later stage of the reaction so as to facilitate distilling-out of the alcohol or phenol produced. Illustrative examples of carbonate esters that can be preferably used in the melt polymerization method include esters of carbonates and an aryl group having 6 to 12 carbon atoms, aralkyl group having 7 to 12 carbon atoms, alkyl group having 1 to 4 carbon atoms and the like. These aryl group, aralkyl group and alkyl group may have their hydrogen atoms partially or fully substituted with a hydroxyl group, a halogen atom or the like. Specific examples of such carbonate esters include diphenyl carbonate, bis(chlorophenyl)carbonate, m-cresyl carbonate, dinaphthyl carbonate, bis(diphenyl)carbonate, dimethyl carbonate, diethyl carbonate, and dibutyl carbonate. Of these, diphenyl carbonate is preferred.

In the melt polymerization method, a polymerization catalyst can be used to increase a polymerization rate. As the polymerization catalyst, catalysts used in an ordinary esterification reaction and transesterification reaction can be suitably used. Illustrative examples thereof include alkali metal compounds such as sodium hydroxide, potassium hydroxide, a sodium salt of dihydric phenol and a potassium salt of dihydric phenol; alkaline earth metal compounds such as calcium hydroxide, barium hydroxide and magnesium hydroxide; nitrogen-containing basic compounds such as tetramethylammonium hydroxide, tetraethylammonium hydroxide, trimethylamine and triethylamine; alkoxides of alkali metals and alkaline earth metals; and organic acid salts of alkali metals and alkaline earth metals, as well as zinc compounds, boron compounds, aluminum compounds, silicon compounds, germanium compounds, organotin compounds, lead compounds, osmium compounds, antimony compounds, manganese compounds, titanium compounds, and zirconium compounds. These catalysts may be used alone or in combination of two or more. These polymerization catalysts are used in an amount of preferably $1\times10^{-9}$ to $1\times10^{-2}$ equivalents, more preferably $1\times10^{-8}$ to $5\times10^{-3}$ equivalents, based on the dihydroxy compounds used as raw materials.

When the polymerization catalyst is used in the melt polymerization method, a catalyst deactivator may be added in the later stage of the reaction. As the catalyst deactivator, known catalyst deactivators are suitably used, and preferred catalyst deactivators are selected according to a polymerization catalyst to be used. For example, as a catalyst deactivator when at least one selected from an alkali metal compound and an alkaline earth metal compound is used as the polymerization catalyst, an ammonium salt or phosphonium salt of sulfonic acid is preferred, and dodecylbenzene sulfonate such as tetrabutylphosphonium dodecylbenzene sulfonate and p-toluenesulfonate such as tetrabutylammonium p-toluenesulfonate are also preferred, for example. Further, as sulfonic acid esters, methyl benzene sulfonate, ethyl benzene sulfonate, butyl benzene sulfonate, octyl benzene sulfonate, phenyl benzene sulfonate, methyl p-toluenesulfonate, ethyl p-toluenesulfonate, butyl p-toluenesulfonate, octyl p-toluenesulfonate, phenyl p-toluenesulfonate and the like are preferably used. Of these, tetrabutylphosphonium dodecylbenzene sulfonate is the most preferably used. These catalyst deactivators can be used in an amount of preferably 0.5 to 50 moles, more preferably 0.5 to 10 moles, much more preferably 0.8 to 5 moles, per mole of the polymerization catalyst selected from an alkali metal compound and an alkaline earth metal compound. In melt polymerization, a molecular weight modifier, an antioxidant and the like may also be added as required.

In the above reaction of the dihydroxy compounds with the carbonate precursor, a terminal blocking agent can be used. The terminal blocking agent can be exemplified by a monofunctional phenol, acid chloride or the like which is suitably used as a terminal blocking agent in a polymerization reaction of a polycarbonate. Illustrative examples of the above monofunctional phenol include phenol, p-t-butylphenol, p-cumylphenol, 3,5-di(trifluoromethyl)phenol, pentafluorophenol, 4-trifluoromethyl-2,3,5,6-tetrafluorophenol, fluorophenol, difluorophenol, trifluorophenol, tetrafluorophenol, trifluoromethyl fluorophenol, isooctylphenol, phenol having a long-chain alkyl group as a substituent, and phenol having an aliphatic polyester group as a substituent. Illustrative examples of the above acid chloride include benzoic chlorides, derivatives of benzoic chlorides, and long-chain alkylcarboxylic chlorides. These terminal blocking agents can be used alone or in combination of two or more. Particularly, when a carbonyl halide, preferably phosgene, is used as the carbonate precursor, a polymer obtained by using these terminal blocking agents shows excellent thermal stability because the terminals of the polymer are blocked by groups derived from the terminal blocking agents.

When the production method of the polymer is the interfacial polymerization method or solution polymerization method, it is preferable to carry out a filtration treatment in a solution state after polymerization so as to remove impurities and foreign materials. Even when the production method of the polymer is the melt polymerization method, the polymer obtained may be dissolved in an appropriate solvent, subjected to a filtration treatment and then isolated and used for production of the optical element of the present invention.

The thus obtained polymer having the structural unit represented by the above formula (i) has a specific viscosity measured in methylene chloride at 20° C. and a concentration of 0.7 g/100 ml of preferably 0.1 to 2.0, more preferably 0.1 to 0.5, much more preferably 0.15 to 0.3.

The relationship between the refractive index $n_D$ and Abbe number $v_D$ of the above polymer satisfies the following formula (I).

$$n_D + 0.0076 \times v_D \leq 1.78 \quad \text{(I)}$$

The above polymer can be suitably used as a raw material for an optical element for correction of chromatic aberration by having the properties that satisfy the above formula (I). Satisfying the above formula (I) indicates that the refractive index is significantly lower than the general relationships between the refractive indices and Abbe numbers of general-purpose optical plastic materials shown in FIG. 1 and the polymer shows the property opposite to high-refractive-index materials at which prior developments of optical plastic materials have tried to achieve. Further, it has not been known that the above polymer has the optical properties and consequently it has not been even conceived by one skilled in the art to apply the above polymer to an optical element to be used for correction of chromatic aberration. The relationship between the refractive index $n_D$ and the Abbe number $v_D$ more preferably satisfies the following formula (I'):

$$1.65 \leq n_D + 0.0076 \times v_D \tag{I'}$$

particularly preferably satisfies the following formula (I''):

$$1.73 \leq n_D + 0.0076 \times v_D \leq 1.78 \tag{I''}$$

The above refractive index $n_D$ is a refractive index at a D line (wavelength: 587.56 nm) and is preferably 1.48 to 1.58, more preferably 1.50 to 1.57, much more preferably 1.50 to 1.54.

The above Abbe number $v_D$ is represented by the following formula (II):

$$v_D = (n_D - 1)/(n_F - n_c) \tag{II}$$

(wherein $n_D$ is a refractive index at a D line (wavelength: 587.56 nm), $n_F$ is a refractive index at an F line (wavelength: 486.13 nm), and $n_c$ is a refractive index at a C line (wavelength: 656.27 nm))

and is preferably 22 to 35, more preferably 24 to 34, much more preferably 27 to 33, particularly preferably 32 to 33.

The optical element of the present invention which comprises the above polymer may optionally contain additives as required.

Illustrative examples of the above optional additives include a thermal stabilizer, mold releasing agent, antioxidant, ultraviolet absorber, bluing agent, fluorescent dye, other dyes, and antistatic agent.

Although the above polymer has excellent thermal stability, its thermal stability is preferably further improved to stably produce an optical element having a finer concavo-convex shape on the surface and having better optical properties, and the above thermal stabilizer can be added for the purpose. As the thermal stabilizer, a phosphorus based thermal stabilizer is preferred, because a decrease in the molecular weight of the polymer and a change in its color in the production process of the optical element can be inhibited effectively.

Illustrative examples of the phosphorus based thermal stabilizer include a phosphite compound, phosphate compound, phosphonite compound, phosphonate compound and their esters, and tertiary phosphine.

Specific examples of the phosphite compound include triphenyl phosphite, tris(nonylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl) pentaerythritol diphosphite, bis(2,6-di-tert-butyl-4-ethylphenyl)pentaerythritol diphosphite, bis{2,4-bis(1-methyl-1-phenylethyl)phenyl} pentaerythritol diphosphite, phenyl bisphenol A pentaerythritol diphosphite, bis(nonylphenyl)pentaerythritol diphosphite, dicyclohexyl pentaerythritol diphosphite, and a phosphite compound that reacts with a dihydric phenol and has a cyclic structure. Specific examples of the phosphite compound that reacts with a dihydric phenol and has a cyclic structure include 2,2'-methylenebis(4,6-di-tert-butylphenyl) (2,4-di-tert-butylphenyl)phosphite, 2,2'-methylenebis(4,6-di-tert-butylphenyl)(2-tert-butyl-4-methylphenyl)phosphite, and 2,2-methylenebis(4,6-di-tert-butylphenyl)octyl phosphite.

Specific examples of the phosphate compound include tributyl phosphate, trimethyl phosphate, tricresyl phosphate, triphenyl phosphate, trichlorphenyl phosphate, triethyl phosphate, diphenylcresyl phosphate, diphenyl monoorthoxenyl phosphate, tributoxyethyl phosphate, dibutyl phosphate, dioctyl phosphate, and diisopropyl phosphate. Triphenyl phosphate or trimethyl phosphate is preferred.

Specific examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Of these, tetrakis(di-tert-butylphenyl)-biphenylene diphosphonite or bis(di-tert-butylphenyl)-phenyl-phenyl phosphonite is preferred, and tetrakis(2,4-di-tert-butylphenyl)-biphenylene diphosphonite or bis(2,4-di-tert-butylphenyl)-phenyl-phenyl phosphonite is more preferred. The phosphonite compound can be preferably used in combination with a phosphite compound having an aryl group substituted with two or more alkyl groups, out of the above phosphite compounds.

Specific examples of the phosphonate compound include dimethyl benzenephosphonate, diethyl benzenephosphonate, and dipropyl benzenephosphonate.

Specific examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine, and diphenyl benzyl phosphine. A particularly preferred tertiary phosphine is triphenyl phosphine.

The above thermal stabilizers can be used alone or in admixture of two or more. The thermal stabilizer is used in an amount of preferably not larger than 0.15 part by weight, more preferably 0.001 to 0.15 part by weight, much more preferably 0.003 to 0.1 part by weight, particularly preferably 0.005 to 0.05 part by weight, based on 100 parts by weight of the polymer having the structural unit represented by the above formula (i).

In the case of optical elements, it is generally preferable that distortion at the time of molding be reduced as much as possible. A reduction in distortion at the time of molding is also very important for the optical element of the present invention because the present optical element may require accurate transfer of surface shape. From that viewpoint, it is preferable to add a mold releasing agent to the above polymer.

As the mold releasing agent, various mold releasing agents that are suitably used as mold releasing agents for polycarbonate resins can be used. In the present invention, a mold releasing agent comprising a higher fatty acid ester compound having a sodium content of not higher than 1 ppm is particularly suitable. The mold releasing agent is added to the above polymer, and good color is maintained even when molding is carried out under high temperature conditions. Thereby, molding under higher temperature conditions becomes possible, and accurate transfer of the fine concavo-convex shape of a mold becomes possible. As a result, an optical element which has a good surface shape and good color and fulfills designed functions accurately is obtained. The above sodium content can be measured by dissolving 5 g of the mold releasing agent into 50 ml of methylene chloride, adding 80 ml of pure water, stirring the mixture and determining the quantity of sodium dissolved in the pure water by ion chromatography.

The higher fatty acid ester compound can be produced by reacting an alcohol with a higher fatty acid in the presence of sodium hydroxide as a reaction catalyst, for example. By fully washing the reaction product with at least one of water and an alcohol, a higher fatty acid ester having a sufficiently reduced sodium content can be obtained.

The higher fatty acid ester compound is exemplified by an ester compound of a monohydric or polyhydric alcohol and a higher fatty acid, and a partial ester or full ester of a monohydric or polyhydric alcohol having 1 to 20 carbon atoms and a saturated fatty acid having 10 to 30 carbon atoms is preferred. Illustrative examples of such a higher fatty acid ester compound include monoglyceride stearate, monosorbitate stearate, monoglyceride behenate, pentaerythritol monostearate, pentaerythritol tetrastearate, propylene glycol monostearate, stearyl stearate, palmityl palmitate, butyl stearate, methyl laurate, isopropyl palmitate, and 2-ethylhexyl stearate. Of these, monoglyceride stearate or pentaerythritol tetrastearate is preferred. All of the compounds enumerated above as examples are single compounds, and these compounds are generally used in the form of a mixture comprising them as main components. A first reason therefor is that since a higher fatty acid which is a raw material for a higher fatty acid ester is generally produced from natural oils and fats such as animal oil and fat (e.g. beef fat and lard) and vegetable oil and fat (e.g. palm oil), it is obtained in the form of a mixture comprising other fatty acids having different numbers of carbon atoms, a second reason therefor is that a synthesized higher fatty acid ester contains not a few free higher fatty acids, and a third reason therefor is that not a few unreacted alcoholic hydroxyl groups exist in a synthesized higher fatty acid ester.

The higher fatty acid ester compound preferably has an acid value of 20 or less (the acid value can be substantially 0) and an iodine value of 10 or less (the iodine value can be substantially 0). These properties can be determined by a method provided in JIS K0070.

The above mold releasing agents can be used alone or in combination of two or more.

The mold releasing agent is used in an amount of preferably not larger than 0.5 parts by weight, more preferably 0.001 to 0.5 parts by weight, much more preferably 0.005 to 0.1 parts by weight, based on 100 parts by weight of the polymer having the structural unit represented by the above formula (i). When the mold releasing agent is used within the above range, mold releasability is excellent, and adverse influences by the mold releasing agent such as contamination of a mold and deterioration in the color of a molded article do not occur advantageously.

The above antioxidant can be added to prevent oxidation of the optical element of the present invention. Illustrative examples of the antioxidant include a hindered phenol based antioxidant and a lactone based stabilizer.

Illustrative examples of the hindered phenol based antioxidant include triethylene glycol-bis(3-(3-tert-butyl-5-methyl-4-hydroxyphenyl)propionate), 1,6-hexanediol-bis(3-(3,5-di-tert-butyl-4-hydroxyphenyl)propionate, pentaerythritol-tetrakis(3-(3,5-di-tert-butyl-4-hydroxyphenyl)propionate), octadecyl-(3-(3,5-di-tert-butyl-4-hydroxyphenyl)propionate), 1,3,5-trimethyl-2,4,6-tris (3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzyl phosphonate diethyl ester, tris(3,5-di-tert-butyl-4-hydroxybenzyl)isocyanurate, 3,9-bis{1,1-dimethyl-2-[β-(3-tert-butyl-4-hydroxy-5-methylphenyl) propionyloxy]ethyl}-2,4,8,10-tetraoxaspiro(5,5)undecane.

These hindered phenol based antioxidants are preferably used in an amount of not larger than 0.3 part by weight, more preferably 0.0001 to 0.3 parts by weight, much more preferably 0.001 to 0.1 parts by weight, based on 100 parts by weight of the polymer having the structural unit represented by the above formula (i).

Illustrative examples of the lactone based stabilizer include a reaction product of 3-hydroxy-5,7-di-tert-butyl-furan-2-one and o-xylene. The lactone based stabilizer is described in detail in JP-A 7-233160. The lactone based stabilizer is preferably used in an amount of not larger than 0.05 parts by weight, more preferably 0.0005 to 0.05 parts by weight, much more preferably 0.001 to 0.03 parts by weight, based on 100 parts by weight of the polymer having the structural unit represented by the above formula (i).

Further, stabilizers prepared by mixing the lactone based stabilizer with various phosphite compounds and hindered phenol compounds are commercially available. A suitable example thereof is Irganox HP-2921 of CIBA SPECIALTY CHEMICALS CO., LTD.

The above ultraviolet absorber can be added to improve the weather resistance of the optical element of the present invention and block harmful ultraviolet radiation.

Illustrative examples of the ultraviolet absorber include benzophenone based ultraviolet absorbers typified by 2,2'-dihydroxy-4-methoxybenzophenone, triazine based ultraviolet absorbers typified by 2-(4,6-diphenyl-1,3,5-triazine-2-yl)-5-hexyloxyphenol, benzotriazole based ultraviolet absorbers typified by 2-(2H-benzotriazole-2-yl)-4-methyl phenol, 2-(2H-benzotriazole-2-yl)-4-tert-octyl phenol, 2-(2H-benzotriazole-2-yl)-4,6-bis(1-methyl-1-phenylethyl)phenol, 2-(2H-benzotriazole-2-yl)-4,6-di-tert-pentyl phenol, 2-(5-chloro-2H-benzotriazole-2-yl)-4-methyl-6-tert-butylphenol, 2-(5-chloro-2H-benzotriazole-2-yl)-2,4-tert-butylphenol, 2,2'-methylenebis[6-(2H-benzotriazole-2-yl)-4-(1,1,1,3,3-tetramethylbutyl)phenol], cyclic imino ester based ultraviolet absorbers typified by 2,2'-p-phenylenebis(3,1-benzooxazine-4-one), and cyanoacrylate based ultraviolet absorbers typified by 1,3-bis[(2-cyano-3,3-diphenylacryloyl)oxy]-2,2-bis[[(2-cyano-3,3-diphenylacryloyl)oxy]methyl]propane. In addition, hindered amine based light stabilizers typified by bis(2,2,6,6-tetramethyl-4-piperidyl)sebacate and bis(1,2,2,6,6-pentamethyl-4-piperidyl)sebacate can also be used as the ultraviolet absorber. These ultraviolet absorbers or light stabilizers may be used alone or in combination of two or more.

The content of the ultraviolet absorber or light stabilizer is preferably not larger than 5 parts by weight, more preferably 0.01 to 5 parts by weight, much more preferably 0.05 to 1 part by weight, based on 100 parts by weight of the polymer having the structural unit represented by the above formula (i). By using the ultraviolet absorber or light stabilizer within the above range, good color and good ultraviolet absorbing and shielding performance which are required for the optical element are achieved.

The above bluing agent can be added to remove a yellow tinge in the optical element that is caused by the polymer and additive components, particularly the ultraviolet absorber. Any bluing agents that are generally used for polycarbonate resins can be used without any problems. In general, an anthraquinone dye is easy to obtain and preferable. Its content is preferably not higher than 3 ppm, more preferably 0.1 to 3 ppm, much more preferably 0.3 to 1.5 ppm, particularly preferably 0.3 to 1.2 ppm, based on the total of the polymer and all additives.

The above fluorescent dye can be added to control light transmitted through the achromatic element of the present invention when light whose wavelength is not that of visible light is used as visible light. Illustrative examples of the fluorescent dye include a stilbene compound, benzimidazole compound, naphthalimide compound, rhodamine compound, coumarin compound, and oxazine compound.

The above other dyes can be added to color the optical element of the present invention and control transmitted light.

The optical element of the present invention comprises the polymer having the structural unit represented by the above formula (i) and also comprises the above optional additives as required. The optical element of the present invention can be produced from the polymer having the structural unit represented by the above formula (i) or a mixture of the polymer and additives, preferably by a melt molding process.

When the melt molding process is used, it is preferred that a polymer to which a thermal stabilizer and a mold releasing agent have been preferably added be fed to a melt kneader to melt-knead it and obtained strands be pelletized and then melt-molded. The shape of the pellets may be any appropriate shape such as a cylindrical, elliptic cylindrical, prismatic or spherical shape but is preferably a cylindrical or elliptic cylindrical shape. The diameter of the cylinder or the major axis of the elliptic cylinder is preferably 1 to 5 mm, more preferably 1.4 to 4 mm, much more preferably 2 to 3.3 mm. When the pellets are elliptic cylindrical, the proportion of the minor axis to the major axis is preferably 60% or higher, more preferably 65% or higher. The length of the cylinder or elliptic cylinder is preferably 1 to 30 mm, more preferably 2 to 5 mm, much more preferably 2.5 to 3.5 mm. The pellets are preferably those with a reduced proportion of cutting chips. The proportion of cutting chips is preferably 200 ppm or lower, more preferably 100 ppm or lower, much more preferably 80 ppm or lower, in terms of the content of cutting chips that pass through a standard sieve (16-mesh) having an opening size of 1 mm.

The additives may be added uniformly to all pellets used for production of the optical element. Alternatively, master pellets containing all or some of the additives in high concentration may be prepared first and blended with pellets of polymer containing no additives and used in producing the optical element. The additives may be premixed with the polymer prior to pelletization, or the polymer and the additives may be added to a melt kneader separately. When the polymer and the additives are premixed, a V-shaped blender, Henschel mixer, mechanochemical device, extrusion mixer or the like can be used, and the premix may be used after granulated by an extrusion granulator, briquetting machine or the like. When the polymer and the additives are added to a melt kneader separately and some of the additives are liquid, a so-called liquid feeder can be used to feed these additives to the melt kneader.

As the melt kneader, an extruder is suitable. As the extruder, an extruder having a vent from which water in the raw materials and volatile components produced from the melt-kneaded resin can be discharged can be preferably used, and the vent preferably has a vacuum pump for discharging the water and volatile components to the outside of the extruder efficiently. To promote discharge of the water and volatile components, a method comprising injecting water, noble gas, nitrogen gas, carbon dioxide gas or the like in the middle of the extruder, mixing it with the molten resin and then discharging it can also be used. The gas injected may be in a supercritical state. In melt kneading, the molten resin is preferably, for example, passed through a sintered metallic filter, to remove foreign materials. As the filter, a filter having a filtration accuracy of not larger than 10 μm is preferably used. The temperature in melt kneading is preferably Tg+50° C. to Tg+250° C., more preferably Tg+80° C. to Tg+200° C., when the glass transition temperature of the polymer used is Tg (° C.).

To pelletize the obtained strands, equipment such as a pelletizer can be used.

Although the above preferred proportion of cutting chips may be achieved by a method of classifying the obtained pellets, it is preferably achieved by a method of controlling the temperature of the strands upon pelletization. That is, the temperature of the strands is preferably controlled so that when pellets are discharged from a pelletizer such that a stainless-steel container having a depth/diameter ratio of about 1.5 and a volume of at least 1 liter is filled up with the pellets in about 2 minutes and the temperature of the pellets is measured by a thermocouple inserted in the center of the container shortly thereafter, the temperature of the pellets is Tg−30° C. to Tg−15° C., preferably Tg−27° C. to Tg−18° C., when the glass transition temperature of the polymer used is Tg (° C.). When this temperature is higher than Tg−15° C., adhesion of the pellets may occur, while when the temperature is lower than Tg−30° C., the proportion of cutting chips may become liable to increase.

When the polymer or a composition obtained by adding the above optional additives to the polymer is pelletized, production equipment such as a melt kneader or pelletizer is preferably placed in a clean-air atmosphere, cooling water for a cooling bath that has a low content of foreign materials is preferably used, and a raw material feeding hopper, a raw material feeding channel, a pellet storage tank and the like are preferably filled with clean air, so as to reduce foreign materials and impurities as much as possible. For example, a method proposed in JP-A 11-21357 can also be preferably used. Further, a method of feeding inert gas such as nitrogen gas into the production equipment to shut off oxygen can also be suitably used as means for improving the color of the optical element obtained.

The pellets obtained as described above are preferably stored in a closed container and subjected to melt molding.

The obtained pellets are then molded into the optical element of the present invention by a melt molding process. Illustrative examples of the melt molding process include an injection molding process and an extrusion process.

The above injection molding process is a concept including a filling procedure that is called flow molding. In addition to a general molding process, a technique such as injection compression molding, injection press molding, gas assist injection molding, foam molding (including one that involves injection of supercritical fluid), insert molding, in-mold coating molding, adiabatic metallic molding, rapid heating cooling metallic molding, two-color molding, sandwich molding or ultrafast injection molding may be used as appropriate according to purposes. Further, a process comprising producing an untreated molded article and then pressure-forming fine pits and projections on the molded article or a process comprising taking out a part for forming a cavity after molding, carrying out an annealing treatment in the part and taking out a molded article can also be used. For injection molding, either of a cold runner system and a hot runner system may be used. In the above injection molding, the cylinder temperature is preferably Tg+80° C. to Tg+250° C., more preferably Tg+100° C. to Tg+220° C., and the mold temperature is preferably Tg–100° C. to Tg–5° C., more preferably Tg–60° C. to Tg–15° C., when the glass transition temperature of the polymer having the structural unit represented by the above formula (i) is Tg (° C.).

As the above extrusion process, a conventionally known process can be used. When pits and projections are formed on the surface of a molded article, a method of forming them by the shape of a die, a method of forming them by a cooling roll or a method of pressure-forming them on the obtained extruded article can be used.

The optical element of the present invention may be used after subjected to an appropriate surface treatment such as hard coating, antireflection coating or antifog coating as required.

The thus obtained optical element of the present invention is a molded article having a first surface, a second surface that is the back side of the first surface, and sufficiently small thickness as compared with the maximum lengths of these surfaces. The shapes of the first and second surfaces can be exemplified by a circle or a polygon having 3 to 20 vertices. The above maximum length of the surface refers to the diameter of the surface when the shape of the surface is circular and refers to the maximum diagonal out of the diagonals of the surface when the shape of the surface is polygonal. The thickness of the optical element of the present invention is preferably 0.001 to 0.2, more preferably 0.01 to 0.1, with respect to the maximum lengths of the surfaces.

At least one of the first and second surfaces of the optical element of the present invention is nonplanar. For example, the surfaces may be a single curved surface (part of a spherical surface) having a constant curvature radius, a combination of multiple curved surfaces, or a surface having a regular concave-convex or staircase shape.

The above maximum length of the surface is selected as appropriate according to applications. For example, it can be 0.1 to 1,000 mm, or 1 to 100 mm.

The optical element of the present invention is used for correction of chromatic aberration in an achromatic lens system comprising a plurality of optical elements (lenses) or an achromatic lens. At least one of other optical elements used in combination with the optical element of the present invention is preferably made of a material having an Abbe number $v_D$ of 50 to 60 and a refractive index $n_D$ of 1.48 to 1.55. Such an optical element is exemplified by an optical element made of at least one material selected from the group consisting of glass, a thermosetting resin, a thermoplastic resin and an ultraviolet curable resin. The above thermosetting resin is exemplified by an epoxy acrylate, and the above thermoplastic resin is exemplified by a polymethyl methacrylate resin and a polycyclic olefin. Suitable examples of commercial products of the polycyclic olefin include ZEONEX (product of ZEON CORPORATION), ARTON (product of JSR Corporation), and APEL (product of Mitsui Chemicals Inc.). Of these, the thermoplastic resin is preferred, and the polymethyl methacrylate resin is particularly preferred as a material for other optical elements used in combination with the optical element of the present invention.

The achromatic lens system or achromatic lens comprises the optical element of the present invention and other optical elements as described above. The other optical elements may be a convex lens, Fresnel lens or diffraction grating, for example. The convex lens may be a spherical lens, nonspherical lens, biconvex lens or monoconvex lens. The optical element of the present invention which is used in combination with such other optical elements may be a concave lens, Fresnel lens or diffraction grating, for example. The concave lens may be a spherical lens, nonspherical lens, biconvex lens or monoconvex lens.

The achromatic lens system to which the optical element of the present invention is applied is exemplified by an achromatic lens system comprising a plurality of spaced-apart optical elements, and the achromatic lens to which the optical element of the present invention is applied is exemplified by a laminated achromatic lens.

Figure 2:
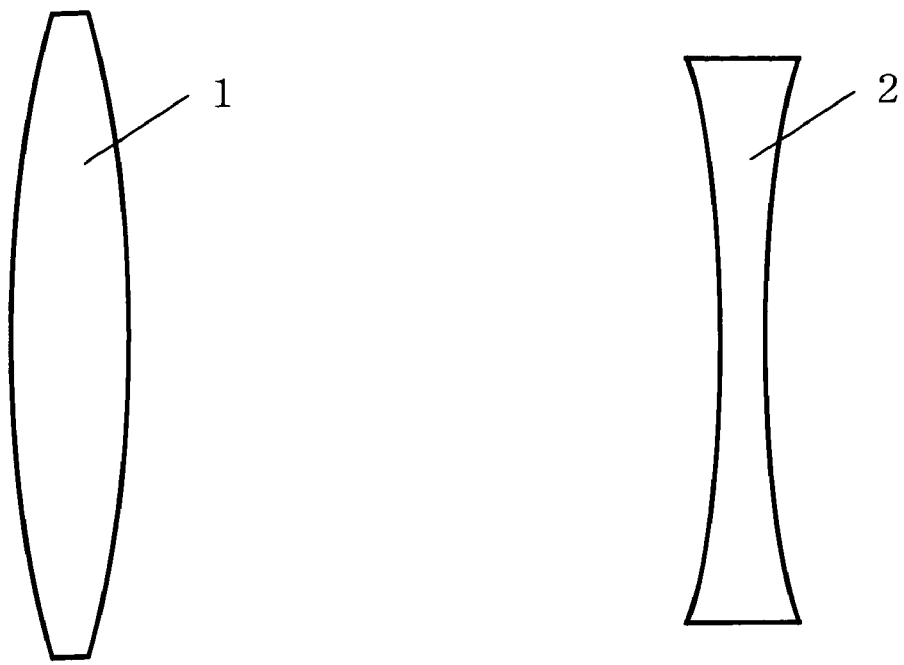
FIG. 2 is a schematic diagram showing a preferred example of achromatic lens system using an optical element of the present invention.

The above achromatic lens system comprising a plurality of spaced-apart optical elements is exemplified by an achromatic lens system comprising convex lenses and concave lenses. An example of such an achromatic lens system is shown in FIG. 2. The achromatic lens system in FIG. 2 comprises other optical element 1 which is a convex lens and the optical element 2 of the present invention which is a concave lens. These lenses are preferably disposed and used with their centers on the same axis and with appropriate spacing therebetween. Light enters from the convex lens side, and imaging occurs on the right side of the concave lens.

Illustrative examples of the above laminated achromatic lens include an achromat lens and a laminated diffraction lens.

Figure 3:
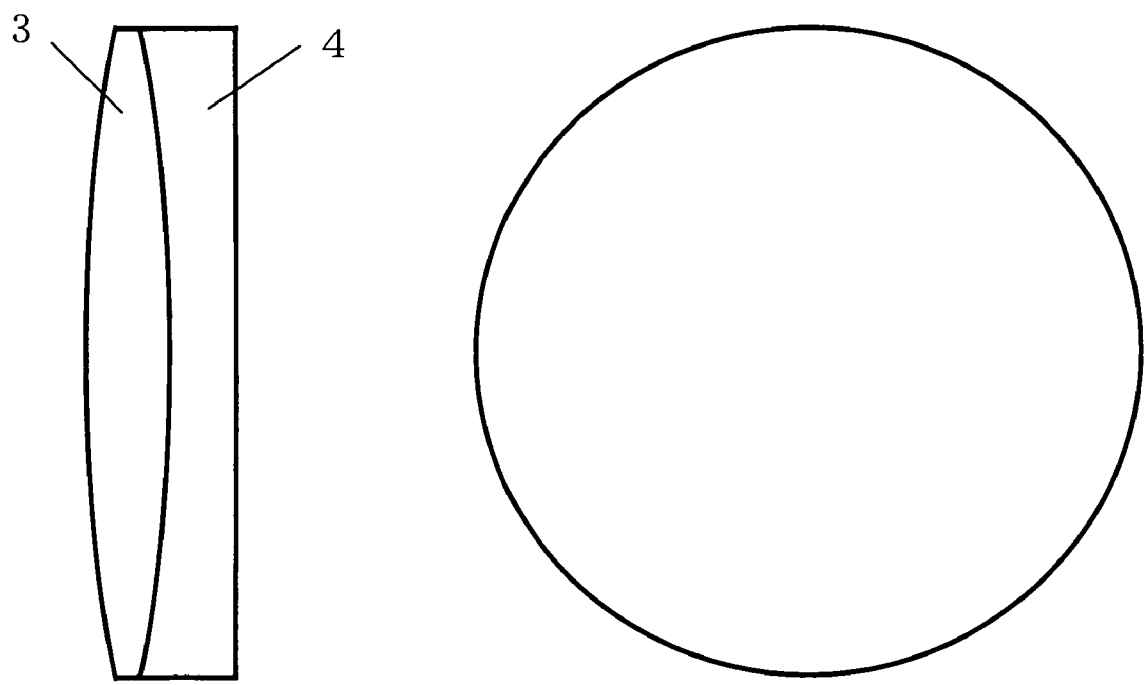
FIG. 3 is a schematic diagram showing a preferred example of achromatic lens of the present invention.

The achromat lens is an achromatic lens formed by laminating a convex-lens-shaped optical element called "crown" and an optical element called "flint" and having a surface that fits the "crown". A preferred example of the achromat lens is shown in FIG. 3. The achromat lens in FIG. 3 is formed by laminating other optical element 3 which is a "crown" and the optical element 4 of the present invention which is a "flint". In this case, light enters from the crown 3 side, and imaging occurs on the right side of the flint 4.

The laminated diffraction lens is formed by laminating the optical element of the present invention and other optical element made of such a material as described above, and the interface therebetween forms a fine three-dimensional shape. The three-dimensional shape can be exemplified by a relief pattern having a staircase shape, kinoform shape or serrated shape. When the achromatic lens system of the present invention is a laminated diffraction lens, very efficient correction of chromatic aberration becomes possible, and focal length after correction of chromatic aberration can be made very short as compared with conventionally known achromatic lens systems. Illustrative examples of laminated diffraction lenses to which the optical element of the present invention can be suitably applied include those described in JP-A 2003-315524 and 2004-212495.

Figure 4:
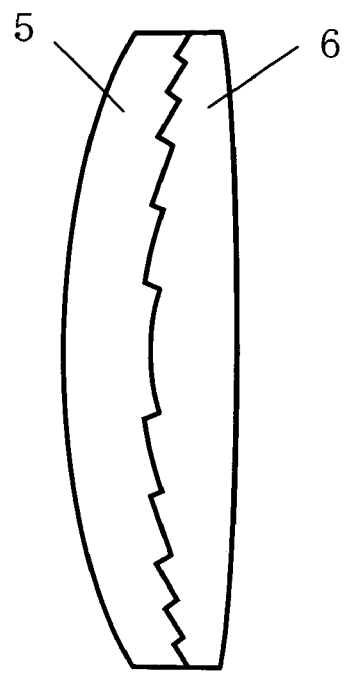
FIG. 4 is a schematic diagram showing a preferred example of the achromatic lens of the present invention.
Figure 4:
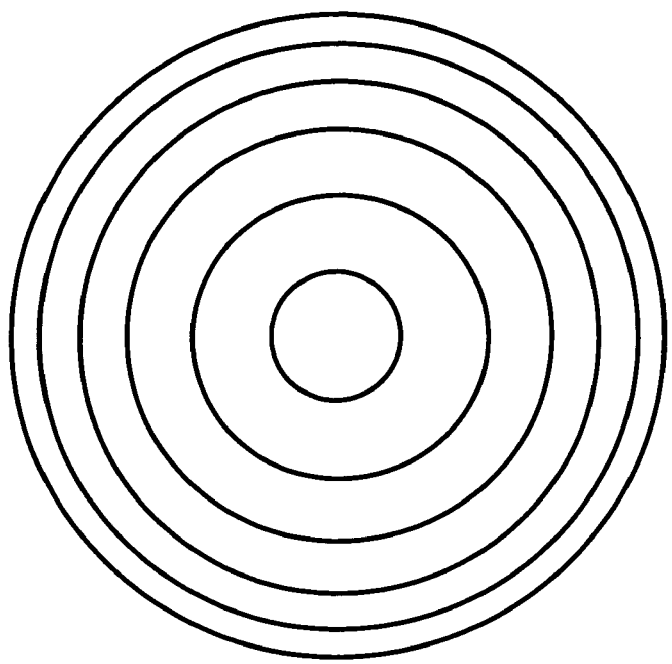

A preferred example of the laminated diffraction lens is shown in FIG. 4. The laminated diffraction lens in FIG. 4 is formed by laminating the optical element 5 of the present invention and other optical element 6, and the interface therebetween forms a staircase shape. The staircase shape of the interface of the laminated diffraction lens in FIG. 4 has about 5 steps between the center and periphery of the lens. However, it should be understood that this is a schematic diagram, the pitch of the steps in an actual laminated diffraction lens is preferably about 1 to 300 μm and the number of steps is calculated from the above pitch and the diameter of the lens.

An achromatic lens system or achromatic lens as described above that uses the optical element of the present invention is lightweight, has shortened focal length and can be incorporated into and suitably used particularly for a telephoto lens system or super-telephoto lens system for an analog or digital camera, video camera and the like.

EXAMPLES

In each of the following Examples and Comparative Examples, the Hazen unit color number of a dihydroxy compound used as a raw material for a polymer was measured by a calorimetric method at 25° C. in accordance with JIS K0071-1, using a 20-wt % solution of the dihydroxy compound as a sample. As a solvent used for preparation of the solution, acetone was used when the dihydroxy compound was 1,1-bis(4-hydroxyphenyl)cyclohexane; otherwise, methanol was used.

The specific viscosity of a polymer synthesized in each of Examples and Comparative Examples was measured at 20° C. by using a methylene chloride solution (concentration: 0.7 g/100 ml) of the polymer as a sample.

Further, "Tg" in the following description refers to the glass transition temperature (° C.) of a polymer used.

[Preparation Examples of Mold Releasing Agent]

Preparation Example 1

Glycerin and stearic acid of Wako Pure Chemical Industries, Ltd. which were special grade chemicals were reacted with each other in the usual manner, using sodium hydroxide as a catalyst, to obtain glycerin monostearate. The sodium content of the prepared glycerin monostearate was 9.8 ppm.

Preparation Example 2

The glycerin monostearate prepared in the above Preparation Example 1 was fully rinsed with water to prepare glycerin monostearate having a sodium content of 0.2 ppm.

Example 1

Synthesis of Polymer

To a reactor equipped with a thermometer, agitator and reflux condenser, 460.1 parts by weight of ion exchange water and 79.0 parts by weight of 48-wt % sodium hydroxide aqueous solution were added. Then, 82.1 parts by weight (76.5 mol % of all dihydroxy compounds) of 2,2-bis(4-hydroxyphenyl)-1,1,1,3,3,3-hexafluoropropane having a Hazen unit color number of 30, 19.2 parts by weight (23.5 mol % of all dihydroxy compounds) of 2,2-bis(4-hydroxy-3-methylphenyl)propane having a Hazen unit color number of 20, and 0.20 part by weight of hydrosulfite were added and dissolved therein. Then, after 271.3 parts by weight of methylene chloride was added, 41.1 parts by weight of phosgene was blown into the mixture under agitation at 15 to 20° C. over 60 minutes. After phosgene was blown into the mixture, 2.9 parts by weight of p-t-butylphenol and 18.4 parts by weight of 48-wt % sodium hydroxide aqueous solution were added to emulsify the mixture, and then 0.1 part by weight of triethylamine was added and agitated at 28 to 33° C. for 1 hour to complete the reaction. After completion of the reaction, the product was diluted with methylene chloride. After the methylene chloride layer was washed with ion exchange water until used washing water became neutral, the layer was washed with diluted hydrochloric acid, and washing with ion exchange water was repeated until the conductivity of the water layer became nearly the same as that of the ion exchange water. The solvent was removed from the methylene chloride layer to obtain a polymer 1 (polycarbonate) having a specific viscosity of 0.19 (yield: 95%).

[Preparation of Polymer Pellets]

The polymer 1 obtained in the above [Synthesis of Polymer] was hot-air dried at 120° C. for 5 hours. 100 parts by weight of the hot-air dried polymer 1 was dry-blended with 0.01 part by weight of tris(2,4-di-tert-butylphenyl)phosphite as a stabilizer and 0.05 part by weight of the glycerin monostearate prepared in the above Preparation Example 2 and having a sodium metal content of 0.2 ppm as a mold releasing agent.

This blend was extruded into strands by use of a vented twin screw extruder having a disk filter (product of Japan Steel Works, Ltd., model "TEX30α-XSST", full engagement, unidirectional rotation, double thread screw) at a discharge rate of 20 kg/h, a screw rotation speed of 180 rpm, a vacuum degree of the vent of 3 kPa and an extrusion temperature that gradually increased from Tg+100° C. to Tg+120° C. After water-cooled, the extruded strands were cut by a pelletizer to prepare elliptic pellets each having a major axis of 3.4 mm, a minor axis of 2.3 mm and a length of 2.7 mm. At that time, the temperature of a cooling bath for water-cooling the strands and immersion time were adjusted such that when the pellets discharged from the pelletizer filled up a stainless-steel container having a depth/diameter ratio of about 1.5 and a volume of 1 liter in about 2 minutes and the temperature of the pellets was measured by a thermocouple inserted in the center of the container shortly thereafter, the temperature of the pellets was Tg−30° C. to Tg−25° C.

The obtained pellets were injection-molded after dried by use of a clean oven at 120° C. for 5 hours.

[Evaluation of Optical Properties]

The pellets obtained above were fed into an injection molding machine having a clamping pressure of 147 kN and molded into a flat and smooth test piece having a length of 90 mm, a width of 50 mm and a thickness of 2 mm at a cylinder temperature of Tg+130° C. and a mold temperature of Tg−35° C.

When the color (b value) of the obtained test piece was measured by use of a calorimeter "SE2000" of Nippon Denshoku Industries Co., Ltd., it was 1.8.

Further, when the Abbe number and refractive index of this test piece were measured at 23° C. by use of an Abbe refractometer of ATAGO CO., LTD. and bromonaphthalene as contact liquid, the Abbe number $v_D$ was 32 and the refractive index $n_D$ was 1.52. When the value of the left side ($\chi_P = n_D + 0.0076 \times v_D$) of the above formula (I) was calculated by use of these values, it was 1.76, which satisfied the above formula (I). Examples 2 to 25 and Comparative Examples 1 to 3

The procedure in [Synthesis of Polymer] of Example 1 was repeated except that dihydroxy compounds shown in Table 1 were used at mixing ratios shown in Table 1, to synthesize polymers 2 to 28, pellets were prepared from the synthesized polymers in the same manner as in Example 1, and various evaluations were made.

In [Preparation of Polymer Pellets] of Example 16, the glycerin monostearate prepared in the above Preparation Example 1 and having a sodium content of 9.8 ppm was used as a mold releasing agent.

The results are shown in Table 1.

Comparative Example 4

To a reactor equipped with an agitator, distiller and decompressor, 43.2 parts by weight (50 mol % of all dihydroxy compounds) of 1,4-cyclohexane dimethanol having a Hazen unit color number of 20, 68.4 parts by weight (50 mol % of all dihydroxy compounds) of 2,2-bis(4-hydroxyphenyl)propane having a Hazen unit color number of 10, 134.96 parts by weight of diphenyl carbonate, 0.18 part by weight of tetramethylammonium hydroxide and $8\times10^{-4}$ part by weight of sodium hydroxide were added, and after substituted with nitrogen, the content of the reactor was heated to 140° C. and molten. After the content of the reactor was agitated for 30 minutes, the pressure was gradually decreased while the internal temperature was increased to 180° C., the mixture was allowed to react at 13.3 kPa for 30 minutes, and produced phenol was distilled off. Then, the temperature was increased with this pressure retained, and the mixture was allowed to react at 190° C. for 30 minutes, 200° C. for 40 minutes, 220° C. for 30 minutes and 240° C. for 30 minutes while phenol was distilled off. Then, the pressure was gradually decreased to 133 Pa or lower. With this pressure retained, the mixture was further agitated at 240° C. for 4 hours to obtain a polymer 29.

Pellets were prepared in the same manner as in Example 1 by use of the above synthesized polymer 29, and various evaluations were made.

The results are shown in Table 1.

In Table 1, dihydroxy compounds are referred to by the following symbols, and units of numbers in cells for the dihydroxy compounds are mol %. Further, "-" indicates that dihydroxy compounds corresponding to cells having "-" were not used.

BP-AF-1: 2,2-bis(4-hydroxyphenyl)-1,1,1,3,3,3-hexafluoropropane having a Hazen unit color number of 30 [fluorine containing weight ratio $F_M$ in the structural unit corresponding to the general formula (i)=0.31]

BP-AF-2: 2,2-bis(4-hydroxyphenyl)-1,1,1,3,3,3-hexafluoropropane having a Hazen unit color number of 10 [fluorine containing weight ratio $F_M$ in the structural unit corresponding to the general formula (i)=0.31]

BP-C: 2,2-bis(4-hydroxy-3-methylphenyl)propane having a Hazen unit color number of 20

BP-AP: 1,1-bis(4-hydroxyphenyl)-1-phenylethane having a Hazen unit color number of 20

BP-A: 2,2-bis(4-hydroxyphenyl)propane having a Hazen unit color number of 10

BP-Z: 1,1-bis(4-hydroxyphenyl)cyclohexane having a Hazen unit color number of 10

BP-TMC: 1,1-bis(4-hydroxyphenyl)-3,3,5-trimethylcyclohexane having a Hazen unit color number of 10

BC-S: bis(4-hydroxy-3-methylphenyl)sulfide having a Hazen unit color number of 50

BC-F: 9,9-bis(4-hydroxy-3-methylphenyl)fluorene having a Hazen unit color number of 20

BP-M: α,α'-bis(4-hydroxyphenyl)-m-diisopropylbenzene having a Hazen unit color number of 10

BC-M: α,α'-bis(4-hydroxy-3-methylphenyl)-m-diisopropylbenzene having a Hazen unit color number of 50

CHDM: 1,4-cyclohexane dimethanol having a Hazen unit color number of 20

TABLE 1

| Names of Polymers | | Example 1 Polymer 1 | Example 2 Polymer 2 | Example 3 Polymer 3 | Example 4 Polymer 4 | Example 5 Polymer 5 | Example 6 Polymer 6 | Example 7 Polymer 7 |
|---|---|---|---|---|---|---|---|---|
| Dihydroxy Compounds | BP-AF-1 | 76.5 | 55 | 70 | 76 | — | 70 | 75 |
| | BP-AF-2 | — | — | — | — | 76 | — | — |
| | BP-C | 23.5 | 45 | — | — | — | — | — |
| | BP-AP | — | — | 30 | — | — | — | — |
| | BP-A | — | — | — | 24 | 24 | — | — |
| | BP-Z | — | — | — | — | — | 30 | — |
| | BP-TMC | — | — | — | — | — | — | 25 |
| | BC-S | — | — | — | — | — | — | — |
| | BC-F | — | — | — | — | — | — | — |
| | BP-M | — | — | — | — | — | — | — |
| | BC-M | — | — | — | — | — | — | — |
| | CHDM | — | — | — | — | — | — | — |
| Fluorine Containing Weight Ratio $F_P$ | | 0.25 | 0.19 | 0.23 | 0.26 | 0.26 | 0.23 | 0.24 |
| Specific Viscosity | | 0.19 | 0.19 | 0.21 | 0.20 | 0.20 | 0.25 | 0.22 |
| Glass Transition Temperature (° C.) | | 148 | 157 | 160 | 154 | 154 | 164 | 167 |
| Optical Properties | Color (b Value) | 1.8 | 1.8 | 1.8 | 1.7 | 1.6 | 1.7 | 1.7 |
| | Abbe Number ($v_D$) | 32 | 31 | 30 | 30 | 30 | 32 | 32 |
| | Refractive Index ($n_D$) | 1.52 | 1.54 | 1.53 | 1.53 | 1.53 | 1.53 | 1.52 |
| | $X_P$ | 1.76 | 1.78 | 1.77 | 1.78 | 1.78 | 1.77 | 1.76 |

| Names of Polymers | | Example 8 Polymer 8 | Example 9 Polymer 9 | Example 10 Polymer 10 | Example 11 Polymer 11 | Example 12 Polymer 12 | Example 13 Polymer 13 | Example 14 Polymer 14 |
|---|---|---|---|---|---|---|---|---|
| Dihydroxy Compounds | BP-AF-1 | 85 | 100 | — | 89.5 | — | 86.5 | 65 |
| | BP-AF-2 | — | — | 100 | — | 89.5 | — | — |
| | BP-C | — | — | — | — | — | — | — |
| | BP-AP | — | — | — | — | — | — | — |
| | BP-A | — | — | — | — | — | — | — |
| | BP-Z | — | — | — | — | — | — | — |
| | BP-TMC | — | — | — | — | — | — | — |
| | BC-S | 15 | — | — | — | — | — | — |
| | BC-F | — | — | — | 10.5 | 10.5 | 13.5 | 35 |
| | BP-M | — | — | — | — | — | — | — |
| | BC-M | — | — | — | — | — | — | — |
| | CHDM | — | — | — | — | — | — | — |
| Fluorine Containing Weight Ratio $F_P$ | | 0.27 | 0.31 | 0.31 | 0.28 | 0.28 | 0.27 | 0.20 |

TABLE 1-continued

| | | | | | | | | |
|---|---|---|---|---|---|---|---|---|
| Specific Viscosity | | 0.20 | 0.19 | 0.19 | 0.19 | 0.19 | 0.19 | 0.21 |
| Glass Transition Temperature (° C.) | | 161 | 148 | 148 | 166 | 166 | 167 | 187 |
| Optical Properties | Color (b Value) | 1.9 | 1.7 | 1.5 | 1.7 | 1.6 | 1.7 | 1.7 |
| | Abbe Number ($v_D$) | 31 | 32 | 32 | 31 | 31 | 30 | 27 |
| | Refractive Index ($n_D$) | 1.53 | 1.51 | 1.51 | 1.53 | 1.53 | 1.53 | 1.56 |
| | $X_P$ | 1.77 | 1.75 | 1.75 | 1.77 | 1.77 | 1.76 | 1.77 |

| | Names of Polymers | Example 15 Polymer 15 | Example 16 Polymer 16 | Example 17 Polymer 17 | Example 18 Polymer 18 | Example 19 Polymer 19 | Example 20 Polymer 20 | Example 21 Polymer 21 |
|---|---|---|---|---|---|---|---|---|
| Dihydroxy Compounds | BP-AF-1 | — | 60 | 84 | — | 81 | 70 | 85 |
| | BP-AF-2 | 65 | — | — | 84 | — | — | — |
| | BP-C | — | — | — | — | — | — | — |
| | BP-AP | — | — | — | — | — | — | — |
| | BP-A | — | — | — | — | — | — | — |
| | BP-Z | — | — | — | — | — | — | — |
| | BP-TMC | — | — | — | — | — | — | — |
| | BC-S | — | — | — | — | — | — | — |
| | BC-F | 35 | 40 | — | — | — | — | — |
| | BP-M | — | — | 16 | 16 | 19 | 30 | — |
| | BC-M | — | — | — | — | — | — | 15 |
| | CHDM | — | — | — | — | — | — | — |
| Fluorine Containing Weight Ratio $F_P$ | | 0.20 | 0.18 | 0.26 | 0.26 | 0.25 | 0.22 | 0.26 |
| Specific Viscosity | | 0.21 | 0.23 | 0.19 | 0.19 | 0.19 | 0.19 | 0.21 |
| Glass Transition Temperature (° C.) | | 187 | 196 | 141 | 141 | 138 | 120 | 125 |
| Optical Properties | Color (b Value) | 1.6 | 1.8 | 1.7 | 1.6 | 1.7 | 1.7 | 2.0 |
| | Abbe Number ($v_D$) | 27 | 27 | 32 | 32 | 33 | 32 | 31 |
| | Refractive Index ($n_D$) | 1.56 | 1.57 | 1.53 | 1.53 | 1.53 | 1.54 | 1.53 |
| | $X_P$ | 1.77 | 1.78 | 1.77 | 1.77 | 1.78 | 1.78 | 1.77 |

| | Names of Polymers | Example 22 Polymer 22 | Example 23 Polymer 23 | Example 24 Polymer 24 | Example 25 Polymer 25 | C. Ex. 1 Polymer 26 | C. Ex. 2 Polymer 27 | C. Ex. 3 Polymer 28 | C. Ex. 4 Polymer 29 |
|---|---|---|---|---|---|---|---|---|---|
| Dihydroxy Compounds | BP-AF-1 | 90 | 75 | 90 | 95 | — | — | — | — |
| | BP-AF-2 | — | — | — | — | — | — | — | — |
| | BP-C | — | 25 | — | — | — | — | — | — |
| | BP-AP | — | — | — | — | — | — | — | — |
| | BP-A | 10 | — | — | — | 100 | — | 50 | 50 |
| | BP-Z | — | — | 10 | — | — | — | — | — |
| | BP-TMC | — | — | — | — | — | — | — | — |
| | BC-S | — | — | — | — | — | — | — | — |
| | BC-F | — | — | — | 5 | — | — | 50 | — |
| | BP-M | — | — | — | — | — | 100 | — | — |
| | BC-M | — | — | — | — | — | — | — | — |
| | CHDM | — | — | — | — | — | — | — | 50 |
| Fluorine Containing Weight Ratio $F_P$ | | 0.25 | 0.25 | 0.29 | 0.30 | 0 | 0 | 0 | 0 |
| Specific Viscosity | | 0.19 | 0.20 | 0.19 | 0.20 | 0.30 | 0.19 | 0.28 | 0.43 |
| Glass Transition Temperature (° C.) | | 148 | 141 | 151 | 157 | 150 | 120 | 195 | 93 |
| Optical Properties | Color (b Value) | 1.5 | 1.3 | 1.6 | 1.5 | 1.5 | 2.2 | 2.0 | 1.6 |
| | Abbe Number ($v_D$) | 32 | 33 | 32 | 32 | 30 | 31 | 25 | 37 |
| | Retractive Index ($n_D$) | 1.52 | 1.53 | 1.52 | 1.52 | 1.58 | 1.59 | 1.62 | 1.56 |
| | $X_P$ | 1.76 | 1.77 | 1.76 | 1.76 | 1.81 | 1.82 | 1.81 | 1.83 |

C. Ex.: Comparative Example

Evaluation as Optical Element for Correction of Chromatic Aberration

Calculation Example 1

To examine the effect of the optical element of the present invention, focal lengths of an F line (wavelength: 486.13 nm) and a C line (wavelength: 656.27 nm) were calculated under the following conditions.

A laminated lens prepared by laminating a convex lens (diameter: 60 mm, curvature radius of curved surface of light entering surface: +120 mm, curvature radius of curved surface of light exiting surface: −80 mm, maximum thickness at the center of the lens: 20 mm) made of polymethyl methacrylate resin ($v_D$=57, $n_D$=1.491, $n_F$=1.496, $n_C$=1.488) with a concave lens (diameter: 60 mm, curvature radius of curved surface of light entering surface: −80 mm, curvature radius of curved surface of light exiting surface: −550 mm, minimum thickness at the center of the lens: 5 mm) made of the polymer 9 prepared in the above Example 9 was assumed, and focal lengths of the F line and C line were calculated with the convex lens side being a light entering side. For calculation of the focal lengths, "Lens Design, Optical System Performance Evaluation Program POPS 0.0.7" (Available from an Internet site <URL: http://www.vector.co.jp/soft/win95/edu/se136306.html>. Searched on Oct. 25, 2006) was used.

The calculation results are shown in Table 2 together with the refractive indices at the F line and C line of the polymer used for the concave lens. Calculation Examples 2 to 7 and Comparative Calculation Examples 1 to 3

Focal lengths of the F line and C line were calculated in the same manner as in Calculation Example 1 except that concave lenses made of polymers shown in Table 2 were used in place of the concave lens made of the polymer 9.

The calculation results are shown in Table 2 together with the refractive indices at the F line and C line of the polymers used for the concave lenses.

TABLE 2

|  | Polymer | | | Focal Lengths | | |
|---|---|---|---|---|---|---|
|  |  | Optical Properties | |  |  | Difference |
|  | Kind | Refractive Index $n_F$ at Line F | Refractive Index $n_C$ at Line C | Line F (mm) | Line C (mm) | between F and C (mm) |
| C. Ex. 1 | Polymer 9 | 1.518 | 1.502 | 210.469 | 210.428 | 0.041 |
| C. Ex. 2 | Polymer 17 | 1.537 | 1.521 | 219.300 | 219.262 | 0.038 |
| C. Ex. 3 | Polymer 19 | 1.540 | 1.524 | 220.762 | 220.725 | 0.037 |
| C. Ex. 4 | Polymer 22 | 1.526 | 1.510 | 214.099 | 214.060 | 0.039 |
| C. Ex. 5 | Polymer 23 | 1.537 | 1.521 | 219.300 | 219.262 | 0.038 |
| C. Ex. 6 | Polymer 24 | 1.526 | 1.510 | 214.099 | 214.060 | 0.039 |
| C. Ex. 7 | Polymer 25 | 1.526 | 1.510 | 214.099 | 214.060 | 0.039 |
| C. C. Ex. 1 | Polymer 26 | 1.596 | 1.577 | 252.134 | 250.216 | 1.918 |
| C. C. Ex. 2 | Polymer 28 | 1.636 | 1.611 | 280.604 | 273.644 | 6.960 |
| C. C. Ex. 3 | Polymer 29 | 1.567 | 1.552 | 234.853 | 235.379 | 0.526 |

C. Ex.: Calculation Example, C. C. Ex.: Comparative Calculation Example

The invention claimed is:

1. An optical element comprising a polymer which consists of has a structural unit represented by the following general formula (i), or consist of a structural unit represented by the following general formula (i) and the following general formula (ii) or (iii):

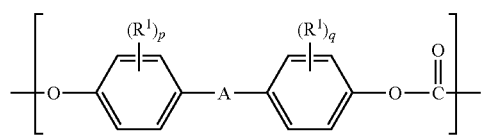
(i)

(wherein $R^1$s are each independently a halogen atom or a monovalent organic group which is selected from the group consisting of an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms and an aralkyloxy group having 7 to 20 carbon atoms and whose hydrogen atoms may be partially or fully substituted with a halogen atom, p and q are each independently an integer of 0 to 4, A is a single bond or a divalent group selected from the following formulas (i-1) to (i-4):

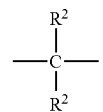
(i-1)

(wherein $R^2$s are each independently a hydrogen atom, a halogen atom, or a hydrocarbon group having 1 to 10 carbon atoms whose hydrogen atoms may be partially or fully substituted with a halogen atom)

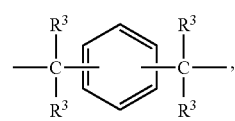
(i-2)

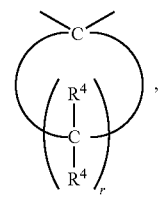
(i-3)

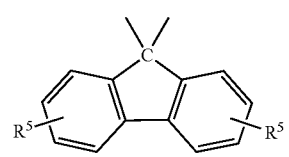
(i-4)

(wherein $R^3$s, $R^4$s and $R^5$s are each independently a hydrogen atom, a halogen atom, or a hydrocarbon group having 1 to 4 carbon atoms whose hydrogen atoms may be partially or fully substituted with a halogen atom, and r is an integer of 4 to 11), and when A is a single bond or a divalent group containing no fluorine atom, p and q are not 0 at the same time and at least one of $R^1$s present in the formula (i) is a fluorine atom or a monovalent organic group whose hydrogen atoms have been partially or fully substituted with a fluorine atom)

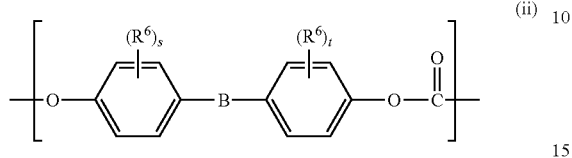
(ii)

(wherein $R^6$s are each independently a halogen atom other than a fluorine atom or a monovalent organic group which is selected from the group consisting of an alkyl group having 1 to 10 carbon atoms, and alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms and an aralkyloxy group having 7 to 20 carbon atoms and whose hydrogen atoms may be partially or fully substituted with a halogen atom other than a fluorine atom, s and t are each independently an integer of 0 to 4, and B is a single bond or a divalent group selected from the following formulas (ii-1) to (ii-8):

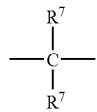
(ii-1)

(wherein $R^7$s are each independently a hydrogen atom, a halogen atom other than a fluorine atom, or a hydrocarbon group having 1 to 6 carbon atoms)

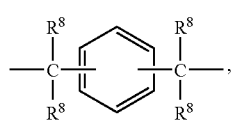
(ii-2)

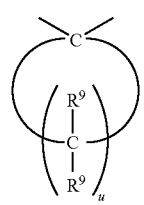
(ii-3)

(wherein $R^8$ s and $R^9$ s are each independently a hydrogen atom, a halogen atom other than a fluorine atom or a hydrocarbon group having 1to 4 carbon atoms, and u is an integer of 4 to 6))

(ii-4)

(ii-5)

(ii-6)

(ii-7)

(II-8)

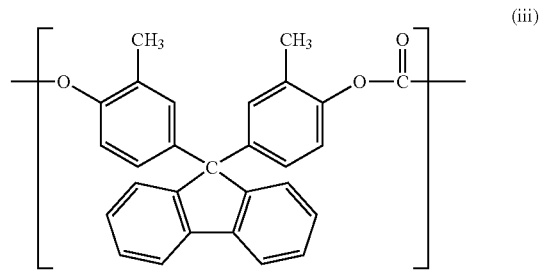
(iii)

and in which the relationship between a refractive index $n_D$ and an Abbe number $V_D$ satisfies the following formula (I):

$$n_D + 0.0076 \times v_D \leq 1.78 \quad (I)$$

and the optical element being used for correction of chromatic aberration.

2. The optical element of claim 1, wherein the Abbe number $v_D$ of the polymer is 22 to 35.

3. The optical element of claim 1, wherein the refractive index $n_D$ of the polymer is 1.48 to 1.58.

4. The optical element of claim 1, wherein a fluorine containing weight ratio $F_M$ in the structural unit represented by the above formula (i) is 0.22 to 0.63.

5. The optical element of claim 1, wherein a fluorine containing weight ratio $F_P$ in the polymer is 0.15 to 0.60.

6. The optical element of claim 1, wherein the structural unit represented by the above formula (i) is a structural unit derived from 2,2-bis(4-hydroxyphenyl)- 1,1,1,3,3,3-hexafluoropropane.

7. The optical element of claim 1, wherein the content of the structural unit (i) contained in the polymer is at least 75 mol % based on the total of the structural unit represented by the above formula (i) and the other structural units.

8. The optical element of claim 1, wherein in the above formula (i), p and q are 0, A is a divalent group represented by the above formula (i-1) and $R^2$ is a trifluoromethyl group,
in the above formula (ii), B is a divalent group represented by the above formula (ii-1), (ii-2) or (ii-3),
when B is a divalent group represented by the above formula (ii-1), both s and t are 0 or 1, and $R^6$ and $R^7$ are a methyl group, when B is a divalent group represented by the above formula (ii-2) or (ii-3), both s and t are 0, $R^8$ is a methyl group, $R^9$ is a hydrogen atom, and u is 5, the content of the structural unit represented by the above formula (i) is at least 75 mol % based on the total of the structural unit (i) and the structural unit (ii) or (iii), the Abbe number $v_D$ is 27 to 33, and the refractive index $n_D$ is 1.50 to 1.54.

9. The optical element of claim 8, wherein the polymer is a bisphenol AF homopolymer, bisphenol AF/1,1-bis(4-hydroxyphenyl)-1-phenylethane copolymer, bisphenol AF/2,2-bis(4-hydroxyphenyl)propane copolymer, bisphenol AF/1,1-bis(4-hydroxyphenyl)cyclohexane copolymer, bisphenol AF/1,1-bis(4-hydroxyphenyl)-3,3,5-trimethylcyclohexane copolymer, bisphenol AF/9,9-bis(4-hydroxy-3-methylphenyl)fluorene copolymer, bisphenol AF/α,α'-bis(4-hydroxyphenyl)-m-diisopropylbenzene copolymer, or bisphenol AF/2,2-bis(4-hydroxy-3-methylphenyl)propane copolymer.

10. An achromatic lens comprising an optical element made of a material having an Abbe number $V_D$ of 50 to 60 and a refractive index of 1.48 to 1.55 and the optical element of claim 1.

11. The achromatic lens of claim 10, which is a laminated achromatic lens.

* * * * *